US012633610B2

(12) United States Patent
    Fang et al.

(10) Patent No.: US 12,633,610 B2
(45) Date of Patent: May 19, 2026

(54) BATTERY BOX, BATTERY, HOLDER, AND ELECTRICAL APPARATUS

(71) Applicant: CONTEMPORARY AMPEREX TECHNOLOGY (HONG KONG) LIMITED, Hong Kong (CN)

(72) Inventors: Zhengyu Fang, Ningde (CN); Wenhui Zhang, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 271 days.

(21) Appl. No.: 18/196,468

(22) Filed: May 12, 2023

(65) Prior Publication Data
    US 2023/0282921 A1      Sep. 7, 2023

Related U.S. Application Data

(63) Continuation of application No. PCT/CN2021/115136, filed on Aug. 27, 2021.

(51) Int. Cl.
    *H01M 50/262*      (2021.01)
    *H01M 50/249*      (2021.01)
                (Continued)

(52) U.S. Cl.
    CPC ....... *H01M 50/262* (2021.01); *H01M 50/249* (2021.01); *H01M 50/289* (2021.01);
                (Continued)

(58) Field of Classification Search
    CPC ............. H01M 50/262; H01M 50/249; H01M 50/289; H01M 2220/20; H01M 50/202; H01M 50/209; H01M 50/244; H01M 50/204; H01M 50/242; H01M 50/264; H01M 50/271; B60K 1/04; B60K 2001/0438; B60L 50/60; Y02E 60/10
    See application file for complete search history.

(56) References Cited

U.S. PATENT DOCUMENTS

2010/0175940 A1      7/2010   Taneda et al.
    2012/0073888 A1      3/2012   Taneda et al.
                (Continued)

FOREIGN PATENT DOCUMENTS

CN      109994667      * 12/2017   .............. H01M 2/10
    CN      209972219 U      1/2020
                (Continued)

OTHER PUBLICATIONS

CN 213167697 machine English translation (Year: 2021).*
                (Continued)

*Primary Examiner* — Michael L Dignan
(74) *Attorney, Agent, or Firm* — XSENSUS LLP

(57)          ABSTRACT

A battery box may include a box body for accommodating a battery cell; a first position-limit structure disposed on a side of a first wall of the box body away from the battery cell, wherein the first wall may be perpendicular to a first direction, the first direction is parallel to a traveling direction of the electrical apparatus after the box is mounted on the electrical apparatus, and the first position-limit structure may be used to limit a relative displacement of the box in the first direction.

14 Claims, 13 Drawing Sheets

(51) Int. Cl.
    *H01M 50/289*      (2021.01)
    *B60K 1/04*      (2019.01)
    *B60L 50/60*      (2019.01)

(52) U.S. Cl.
    CPC ................. *B60K 1/04* (2013.01); *B60L 50/60*
    (2019.02); *H01M 2220/20* (2013.01)

(56)           References Cited

U.S. PATENT DOCUMENTS

| | | |
|---|---|---|
| 2013/0192913 A1 | 8/2013 | Joye |
| 2021/0339617 A1 | 11/2021 | Ohkuma et al. |

FOREIGN PATENT DOCUMENTS

| | | | |
|---|---|---|---|
| CN | 110752326 A | 2/2020 | |
| CN | 213167697 * | 5/2021 | .............. B60K 1/04 |
| CN | 213167697 U | 5/2021 | |
| CN | 213768313 U | 7/2021 | |
| CN | 214013076 U | 8/2021 | |
| DE | 102019211266 A1 | 2/2021 | |
| DE | 11 2019 004 338 T5 | 5/2021 | |
| JP | H07-246843 A | 9/1995 | |
| JP | 2010-036902 A | 2/2010 | |
| JP | 2011-131790 A | 7/2011 | |
| JP | 2016-113063 * | 6/2016 | .............. B60K 1/04 |
| JP | 2016-113063 A | 6/2016 | |

OTHER PUBLICATIONS

JP 2016-113063 machine English translation (Year: 2016).*
CN 109994667 machine English translation (Year: 2017).*
Office Action issued Jul. 29, 2024 in Japanese Patent Application No. 2023-529096 with English translation thereof.
Extended European Search Report issued Sep. 11, 2024 in European Patent Application No. 21954626.4.
International Search Report and Written Opinion mailed on May 25, 2022, received for PCT Application PCT/CN2021/115136, filed on Aug. 27, 2021, 17 pages including English Translation.

* cited by examiner

1

14          13          10

10

2100
200
100
2200

400

500

BATTERY BOX, BATTERY, HOLDER, AND ELECTRICAL APPARATUS

CROSS-REFERENCE TO RELATED APPLICATION

The present application is a continuation of International Application No. PCT/CN2021/115136, filed Aug. 27, 2021, which is incorporated herein by reference in its entirety.

TECHNICAL FIELD

Embodiments of the present application relate to the field of batteries, and more particularly, to a battery box, a battery, a holder, and an electrical apparatus.

BACKGROUND ART

Energy saving and emission reduction is the key to sustainable development of the automobile industry. In this case, electric vehicles have become an important part of the sustainable development of the automobile industry because of their advantages of energy saving and environmental protection. For electric vehicles, battery technologies are an important factor related to their development.

In the development of the battery technologies, the installation stability of batteries is also a non-negligible issue in addition to the improvement of performance of the batteries. Therefore, how to enhance the installation stability of the batteries is an urgent technical problem to be solved in the battery technologies.

SUMMARY OF THE DISCLOSURE

The present application provides a battery box, a battery, a holder, and an electrical apparatus, which can enhance installation stability of the battery.

In a first aspect, a battery box is provided, including a box body for accommodating a battery cell; a first position-limit member or structure disposed on a side of a first wall of the box body away from the battery cell, wherein the first wall is perpendicular to a first direction, the first direction is parallel to a traveling direction of an electrical apparatus after the box is mounted on the electrical apparatus, and the first position-limit member is used to limit a relative displacement of the box in the first direction.

Based on the technical solution of embodiments of the present application, the first position-limit member is disposed on the side of the first wall of the box body away from the battery cell, the first wall is perpendicular to the first direction, and the first direction is parallel to a traveling direction of the electrical apparatus after the box is mounted on the electrical apparatus, so that after the box is mounted on the electrical apparatus, the first position-limit member can generate an acting force in the first direction with the electrical apparatus, that is, the first position-limit member can generate an acting force with the electrical apparatus in the traveling direction of the electrical apparatus and the direction opposite to the traveling direction, so as to limit a relative displacement of the box in the traveling direction of the electrical apparatus and the direction opposite to the traveling direction and improve installation stability of the box in the traveling direction of the electrical apparatus and the direction opposite to the traveling direction, thereby reducing influence of the electrical apparatus in a traveling state on the battery and its box, and ensuring normal operations of the battery and the electrical apparatus where the battery is located.

In some possible embodiments, the box further includes a second position-limit member or structure disposed on a side of the box away from the battery cell and used to limit a relative displacement of the box in a second direction, the second direction being parallel to the direction of gravity after the box is mounted on the electrical apparatus.

Based on the technical solution of the embodiments, the second position-limit member is disposed on the side of the box away from the battery cell, the second position-limit member can generate an acting force in the second direction with the electrical apparatus after the box is mounted on the electrical apparatus, that is, the second position-limit member can generate an acting force in the direction of gravity and the opposite direction of gravity with the electrical apparatus, so as to limit a relative displacement of the box in the direction of gravity and the opposite direction of gravity, thereby further improving the installation stability of the box in the electrical apparatus and ensuring normal operations of the battery and the electrical apparatus where the battery is located.

In some possible embodiments, the first position-limit member includes a first position-limit block and a buffer block, wherein the first position-limit block is disposed on the first wall and can move along the first direction, the buffer block is disposed between the first position-limit block and the first wall, and the buffer block is used to provide a buffer distance of the first position-limit block in the first direction.

Based on the technical solution of the embodiments, when mounting the box on the electrical apparatus, the first position-limit block can move toward the inside of the box along the first direction through the matching between the buffer block and the first position-limit block, and the first position-limit block can not bring too much installation resistance, facilitating installation of the box on the electrical apparatus. Further, after the box is mounted on the electrical apparatus, the first position-limit block compresses the buffer block, the buffer block is then in a compressed state to provide an elastic acting force to the first position-limit block, so that the first position-limit block is in closely press fit with the electrical apparatus in the first direction, thereby ensuring the installation stability of the box in the first direction, that is, ensuring the installation stability of the box in the travel direction and the opposite traveling direction of the electrical apparatus.

In some possible embodiments, the first position-limit member further includes a first fastener, wherein the first position-limit block is disposed on the first wall through the first fastener, and the first fastener is used to provide a buffer space for the first position-limit block and the buffer block in the first direction.

Based on the technical solution of the embodiments, the first position-limit block is disposed on the first wall of the box by the first fastener, and the buffer space is provided for the first position-limit block and the buffer block, so that the first position-limit block can generate a relative displacement in the first direction through the buffer block, thereby facilitating the installation of the box on the electrical apparatus and the installation stability of the box in the first direction.

In some possible embodiments, a first end of the first position-limit block is provided with a wedge angle, and the first end of the first position-limit block is an end of the first position-limit block facing toward the opposite direction of gravity.

Based on the technical solution of the embodiments, when mounting the box on the electrical apparatus facing toward the opposite direction of gravity, the first end with the wedge angle in the first position-limit block can be gradually moved in the opposite direction of gravity, and the first end can be used for guiding and positioning of the box when mounting the box in the electrical apparatus, so that the box can be mounted in the electrical apparatus more conveniently.

In some possible embodiments, the second position-limit member is an elastic position-limit block, and the elastic position-limit block is compressed to abut against the electrical apparatus after the box is mounted on the electrical apparatus.

Based on the technical solution of the embodiments, the second position-limit member is an elastic position-limit block, the elastic position-limit block is compressed to abut against the electrical apparatus after the box is mounted on the electrical apparatus, so that there is an elastic force between the elastic position-limit block staying a compressed state and the electrical apparatus; moreover, the elastic position-limit block is in closely press fit with the electrical apparatus in the second direction, thereby ensuring the installation stability of the box in the second direction, that is, ensuring the installation stability of the box in the direction of gravity and the opposite direction of gravity of the electrical apparatus.

In some possible embodiments, a first end of the elastic position-limit block is provided with a chamfer structure, and the first end of the elastic position-limit block is an end of the elastic position-limit block facing toward the opposite direction of gravity.

Based on the technical solution of the embodiments, when mounting the box on the electrical apparatus in the opposite direction of gravity, the first end of the elastic position-limit block facing toward the opposite direction of gravity is in contact with the electrical apparatus first, and acts on the electrical apparatus; the first end of the elastic position-limit block is provided with a chamfer structure, which can facilitate compressing the first end of the elastic position-limit block to the electrical apparatus; besides, compared with a sharp-edge structure, the chamfer structure can avoid a stress concentration, thereby prolonging service life of the elastic position-limit block. In addition, the chamfer structure can also beautify the elastic position-limit block.

In some possible embodiments, the first wall is provided with an accommodating area, the accommodating area being used for accommodating the first position-limit member.

Based on the technical solution of the embodiments, the first wall of the box is provided with the accommodating area for accommodating the first position-limit member; on the one hand, a mounting space of the first position-limit member can be saved, and on the other hand, the first position-limit member can also be protected by the accommodating area, and is prevented from being damaged by external influences, thereby prolonging service life of the first position-limit member in the box.

In some possible embodiments, the first wall includes an extending portion or structure, the extending portion extending along the first direction and away from the battery cell, and being used for arrangement of the second position-limit member.

In some possible embodiments, the center of the first position-limit member and the center of the second position-limit member are located on a first plane, the first plane being parallel to the plane determined by the first direction and the second direction.

Based on the technical solution of the embodiments, the center of the first position-limit member and the center of the second position-limit member are both located on the first plane that is parallel to the plane determined by the first direction and the second direction. When the box body is mounted on the electrical apparatus, an acting force between the first position-limit member and the electrical apparatus as well as an acting force between the second position-limit member and the electrical apparatus is concentrated on the same plane, further improving the installation stability of the box in the electrical apparatus. Further, if the first position-limit member and the second position-limit member are adjacently arranged on the same first wall, the acting force between the first position-limit member and the second position-limit member and the electrical apparatus is more concentrated, so that the installation stability of the box body in the electrical apparatus can be further improved; moreover, the first position-limit member and the second position-limit member are adjacently arranged, which also facilitates the installation and maintenance of the first position-limit member and the second position-limit member.

In some possible embodiments, the box body includes a plurality of first position-limit members, the plurality of first position-limit members being distributed on two first walls of the box body that are parallel to each other.

Based on the technical solution of the embodiments, using the space of the two first walls, the plurality of first position-limit members are distributed on the two first walls, the first position-limit members on the two first walls of the box each can generate an acting force in the first direction with the electrical apparatus, so that the box can be clamped with the electrical apparatus in the first direction, to further limit the relative displacement of the box in the electrical apparatus along the first direction, thereby improving the installation stability of the box in the electrical apparatus.

In some possible embodiments, a plurality of first position-limit members are distributed at four corners of the box body.

Based on the technical solution of the embodiments, the plurality of first position-limit members provided in the box are distributed at the four corners of the box body to limit a relative displacement of the four corners of the box body in the electrical apparatus, thereby improving the installation stability of the box in electrical installations.

In a second aspect, provided is a holder, which is applied to an electrical apparatus, and includes a holder body for mounting of a battery box of the electrical apparatus, wherein the box is used for accommodating battery cells; a third position-limit member disposed on a side of a first beam of the holder body close to the box, wherein an extension direction of the first beam is perpendicular to a first direction, the first direction is parallel to a traveling direction of the electrical apparatus, the third position-limit member is used to limit a relative displacement of the box in the first direction.

Based on the technical solution of the embodiment of the present application, the third position-limit member is disposed on a side of the first beam of the holder body close to the battery box, the extension direction of the first beam is perpendicular to the first direction, and the first direction is parallel to the traveling direction of the electrical apparatus, so that after the box is mounted on the holder body of the electrical apparatus, the third position-limit member can generate an acting force in the first direction with the electrical apparatus, that is, the third position-limit member can generate an acting force with the electrical apparatus in the traveling direction of the electrical apparatus and the direction opposite to the traveling direction, so as to limit the relative displacement of the box in the traveling direction of the electrical apparatus and the direction opposite to the traveling direction and improve installation stability of the box in the traveling direction of the electrical apparatus and the direction opposite to the traveling direction, thereby reducing influence of the electrical apparatus in a traveling state on the battery and its box, and ensuring normal operations of the battery and the electrical apparatus where the battery is located.

In some possible embodiments, the holder further includes a fourth position-limit member or structure disposed on the holder body and used to limit a relative displacement of the box in a second direction, the second direction being parallel to the direction of gravity.

Based on the technical solution of the embodiments, the fourth position-limit member is disposed on the holder body, the fourth position-limit member can generate an acting force with the electrical apparatus in the second direction, that is, the fourth position-limit member can generate an acting force in the direction of gravity and the opposite direction of gravity with the box, so as to limit the relative displacement of the box in the direction of gravity and the opposite direction of gravity, thereby further improving installation stability of the box in the electrical apparatus and ensuring normal operations of the battery and the electrical apparatus where the battery is located.

In some possible embodiments, the fourth position-limit member includes a recess structure, the recess structure having an opening facing toward the direction of gravity.

In some possible embodiments, after the battery box is mounted on the holder body, the recess structure is used for accommodating the second position-limit member of the box, so as to limit the relative displacement of the box in the second direction.

Based on the technical solution of the embodiments, the recess structure can match with the second position-limit member in the battery box, and the recess structure can be used for accommodating the second position-limit member and is in closely press fit with the second position-limit member, so that the box and the holder body are clamped the second direction, improving the installation stability of the box in the direction of gravity and the opposite direction of gravity of the holder body.

In some possible embodiments, the third position-limit member includes a third position-limit block and a second fastener, wherein the second fastener is used to fix the third position-limit block to the first beam, and an end of the third position-limit block facing toward the direction of gravity is provided with a wedge angle.

Based on the technical solution of the embodiments, the end of the third limit block facing toward the opposite direction of gravity can be provided with the wedge angle, so that when mounting the box on the holder facing toward the opposite direction of gravity, the box can be moved step by step toward the opposite direction of gravity by the aid of the end of the third position-limit block that is provided with the wedge angle. The end provided with the wedge angle can be used for guiding and positioning the box when mounting the box to the holder so that the box can be mounted in the holder more conveniently.

In some possible embodiments, the center of the third position-limit member and the center of the fourth position-limit member are located on a first plane, the first plane being parallel to a plane determined by the first direction and the second direction.

Based on the technical solution of the embodiments, the center of the third position-limit member and the center of the fourth position-limit member are both located on the first plane that is parallel to the plane determined by the first direction and the second direction. After the box body is mounted on the holder, an acting force between the third position-limit member and the box as well as an acting force between the fourth position-limit member and the box is concentrated on the same plane, further improving the installation stability of the box in the holder. Further, if the third position-limit member and the fourth position-limit member are adjacently arranged on the same first wall, an acting force between the third position-limit member and fourth position-limit member and the electrical apparatus is more concentrated, so that the installation stability of the box in the holder can be further improved; moreover, the third position-limit member and the fourth position-limit member are adjacently arranged, which also facilitates the installation and maintenance of the third position-limit member and the fourth position-limit member.

In some possible embodiments, the holder includes a plurality of third position-limit members, the plurality of third position-limit members being distributed on at least two first beams of the holder body that are parallel to each other.

Based on the technical solution of the embodiments, using a space of at least two first beams, the plurality of third position-limit members are distributed on the at least two first beams, the third position-limit members on the at least two first beams of the holder body each can generate an acting force in the first direction with the box, so that the box can be clamped with the holder body in the first direction, to further limit the relative displacement of the box in the holder in the first direction, thereby improving the installation stability of the box in the electrical apparatus.

In some possible embodiments, the plurality of third position-limit members are distributed at four corners of a space for accommodating the box body in the holder body.

Based on the technical solution of the embodiments, the plurality of third position-limit members can be further distributed at the four corners of the space for accommodating the box in the holder body, so as to be correspondingly disposed at the four corners of the box to limit relative displacements of the four corners of the box in the holder, thereby comprehensively improving the installation stability of the box in the holder and the electrical apparatus where the box is located.

In a third aspect, a battery is provided, including a battery cell and the battery box in the first aspect or any possible embodiment of the first aspect, wherein the box is used for accommodating the battery cell.

In a fourth aspect, an electrical apparatus is provided, including the battery in the third aspect, and the holder in the second aspect or any possible embodiment of the second aspect, wherein the third position-limit block of the holder matches with the first position-limit member of the battery to limit a relative displacement of the battery in the first direction.

In a fifth aspect, a method for preparing a battery is provided, including providing a box cell; providing a box, the box including a box body for accommodating the battery cell; a first position-limit member disposed on a side of a first wall of the box body away from the battery cell, wherein the first wall is perpendicular to a first direction, the first direction is parallel to a traveling direction of an electrical apparatus after the box is mounted on the electrical apparatus, and the first position-limit member is used to limit a relative displacement of the box in the first direction; and accommodating the battery cell in the box.

In a sixth aspect, a device for preparing a battery is provided, including a first providing module for providing a battery cell; a second providing module for providing a box, the box including a box body for accommodating the battery cell; a first position-limit member disposed on a side of a first wall of the box body away from the battery cell, wherein the first wall is perpendicular to a first direction, the first direction is parallel to a traveling direction of an electrical apparatus after the box is mounted on the electrical apparatus, and the first position-limit member is used to limit a relative displacement of the box in the first direction; and a mounting module for accommodating the battery cell in the box.

Based on the technical solution of the embodiments of the present application, the first position-limit member is disposed on the side of the first wall of the box body away from the battery cell, the first wall is perpendicular to the first direction, and the first direction is parallel to a traveling direction of an electrical apparatus after the box is mounted on the electrical apparatus, so that after the box is mounted on the electrical apparatus, the first position-limit member can generate an acting force in the first direction x with the electrical apparatus, that is, the first position-limit member can generate an acting force with the electrical apparatus in the traveling direction of the electrical apparatus and the direction opposite to the traveling direction, so as to limit a relative displacement of the box in the traveling direction of the electrical apparatus and the direction opposite to the traveling direction and improve installation stability of the box in the traveling direction of the electrical apparatus and the direction opposite to the traveling direction, thereby reducing influence of the electrical apparatus staying in a traveling state on the battery and its box, and ensuring normal operations of the battery and the electrical apparatus where the battery is located.

DESCRIPTION OF DRAWINGS

In order to illustrate the technical solutions of the examples of the present application more clearly, the drawings required in the examples of the present application will be briefly introduced below. Obviously, the drawings described below are only some examples of the present application. For those of ordinary skill in the art, other drawings can also be obtained according to the drawings without any creative effort.

Figure 1:
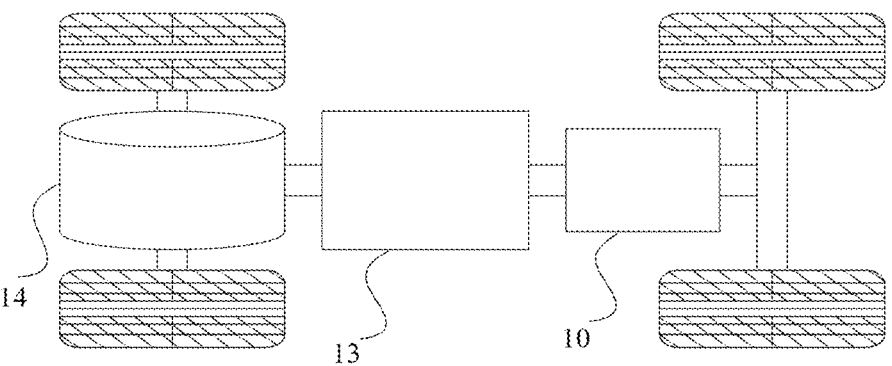
FIG. 1 is a schematic structural diagram of a vehicle according to an embodiment of the present application.

In the drawings, the drawings are not drawn to actual scale.

DESCRIPTION OF REFERENCE NUMERALS vehicle 1, controller 13, motor 14;
battery 10, battery cell 100;
box 20, first portion 2100, second portion 2200;
box body 200, first wall 201, accommodating area 2011, extending portion 2012, second wall
202, third wall 203;
first position-limit member 210, first position-limit block 211, buffer block 212, first fastener 213;
second position-limit member 220;
first mounting member 230;
holder 30;

9 holder body 300, first beam 301, second beam 302;
third position-limit member 310, third position-limit
block 311, second fastener 312;
fourth position-limit member 320, recess structure 321,
first direction x, second direction z, third direction y,
opposite direction of gravity $z_1$, and direction of gravity
$z_2$.

DETAILED DESCRIPTION

The embodiments of the present application are further
described in detail below with reference to the drawings and
embodiments. The following detailed description of the
examples and the drawings are used to illustrate the prin-
ciples of the present application by way of example, but
should not be used to limit the scope of the present appli-
cation, that is, the present application is not limited to the
described examples.

In the description of the present application, it should be
noted that, unless otherwise stated, "plurality of" means two
or more; the orientation or positional relationships indicated
by the terms "upper", "lower", "left", "right", "inner" and
"outer" are only for facilitating the description of the present
application and simplifying the description, rather than
indicating or implying that the apparatus or element referred
to must have a particular orientation or be constructed and
operated in a particular orientation, and therefore will not be
interpreted as position-limit the present application. In addi-
tion, the terms "first", "second" and "third" are used for
descriptive purposes only, and cannot be construed as indi-
cating or implying relative importance. "Vertical" is not
strictly vertical, but within an allowable range of errors.
"Parallel" is not strictly parallel, but within an allowable
range of errors.

Orientation words appearing in the following description
are all directions shown in the drawings, and do not limit the
specific structure of the present application. In the descrip-
tion of the present application, it should also be noted that,
unless otherwise expressly specified and limited, the terms
"mount," "connected," and "connecting" should be broadly
understood, for example, they may be a fixed connection or
a detachable connection or be an integrated connection; or
may be a direct connection or an indirect connection through
an intermediate medium. For those of ordinary skill in the
art, the specific meanings of the above terms in the present
application may be understood according to specific circum-
stances.

In the present application, the term "and/or" is only an
association relationship for describing associated objects,
indicating that three relationships may exist. For example, A
and/or B may represent three situations: A exists alone, both
A and B exist, and B exists alone. In addition, the character
"/" in the present application generally means that the
associated objects before and after it are in an "or" relation-
ship.

Unless otherwise defined, all technical and scientific
terms used in the present application have the same mean-
ings as those commonly understood by those skilled in the
art to which the present application belongs. The terms used
in the specification of the present application are merely for
the purpose of describing specific examples, but are not
intended to limit the present application. The terms "com-
prising" and "having" and any variations thereof in the
specification and the claims of the present application as
well as the foregoing description of the drawings are
intended to cover non-exclusive inclusions. The terms
"first", "second" and the like in the specification and the claims of the present application as well as the above
drawings are used to distinguish different objects, rather than
to describe a specific order or primary-secondary relation-
ship.

Reference herein to "an embodiment" means that a par-
ticular feature, structure, or characteristic described in con-
nection with the embodiment can be included in at least one
embodiment of the present application. The appearance of
this phrase in various places in the specification does not
necessarily refer to the same embodiment, nor is it a separate
or alternative embodiment that is mutually exclusive with
other embodiments. It is understood explicitly and implicitly
by those skilled in the art that the embodiments described in
the present application can be combined with other embodi-
ments.

In the present application, a battery cell may include a
lithium-ion secondary battery, a lithium-ion primary battery,
a lithium-sulfur battery, a sodium/lithium-ion battery, a
sodium-ion battery, or a magnesium-ion battery, etc., which
is not limited in the examples of the present application. The
battery cell may be cylindrical, flat, rectangular, or in other
shapes, which is also not limited in the examples of the
present application. The battery cells are generally divided
into three types according to packaging manners: cylindrical
battery cells, rectangular battery cells, and pouch cells,
which are not limited in the examples of the present appli-
cation.

The battery mentioned in the examples of the present
application refers to a single physical module including one
or more battery cells to provide a higher voltage and
capacity. For example, the battery mentioned in the present
application may include a battery module, a battery pack, or
the like. The battery typically includes a box body for
encapsulating one or more battery cells. The box body can
prevent liquids or other foreign matters from affecting
charging or discharging of the battery cells.

Many design factors, such as energy density, cycle life,
discharge capacity, charge-discharge rate, and safety perfor-
mance of a battery, should be considered in the development
of the battery technology. In addition, the installation safety
of the battery also needs to be taken into account.

Specifically, in an application process, a battery is gen-
erally mounted in an electrical apparatus to provide electri-
cal energy for the electrical apparatus. If the battery is
mounted in the electrical apparatus in an unstable manner
and the stability is poor, when the electrical apparatus stays
in a motion state, especially when it stays in a motion state
with an acceleration, a specific external force is generated on
the battery, causing the battery to have a relative displace-
ment in the electrical apparatus or even be out of a fixed
mounting position, thereby affecting an electrical connection
between the battery and the electrical apparatus, and affect-
ing performance of the battery. Eventually, it may lead to an
abnormal operation of the electrical apparatus and bring
certain safety hazards.

Based on this, the present application provides a battery
box for accommodating a battery cell. The box includes a
first position-limit member. After the box is mounted on the
electrical apparatus, the first position-limit member is used
to limit a relative displacement of the battery in a traveling
direction of the electrical apparatus. Correspondingly, the
present application further provides a holder, which is
applied to an electrical apparatus. The holder is used for
mounting of a battery of the electrical apparatus. The holder
includes a third position-limit member. After the battery box
is mounted on the electrical apparatus, the third position-limit member can also be used to limit the relative displacement of the battery in the traveling direction of the electrical apparatus.

In some application scenarios, the electrical apparatus is generally moved along its traveling direction, and may generate a motion with an acceleration, which has a greater impact on the battery. By providing the first position-limit member on the battery box, and/or, providing the third position-limit member on the holder of the electrical apparatus, the installation stability of the battery in the electrical apparatus, especially the installation stability in the traveling direction of the electrical apparatus can be enhanced, thereby ensuring normal operations of the battery and the electrical apparatus where the battery is located.

The technical solutions described in the embodiments of the present application are all applicable to various electrical apparatuses using batteries, such as electric vehicles, electric toys, electric tools, ships, spacecrafts, and the like. For example, the spacecrafts include airplanes, rockets, space shuttles, spaceships, etc.

It should be understood that the technical solutions described in the examples of the present application are not only applicable to the electrical apparatuses described above, but also applicable to all apparatuses and devices using batteries. However, for the sake of brevity, the following embodiments are described by taking an electric vehicle as an example.

For example, FIG. 1 is a schematic structural diagram of a vehicle 1 according to an embodiment of the present application. The vehicle 1 may be a fuel vehicle, a gas vehicle, or a new energy vehicle, and the new energy vehicle may be an all-electric vehicle, a hybrid electric vehicle, an extended range electric vehicle, or the like. The interior of vehicle 1 may be provided with a motor 14, a controller 13, and a battery 10, and controller 13 is configured to control the battery 10 to supply power to the motor 14. For example, the battery 10 may be arranged at the bottom or the head or the tail of the vehicle 1. The battery 10 may be configured to supply power to the vehicle 1, for example, the battery 10 may be used as an operating power source of the vehicle 1, which is used for a circuit system of the vehicle 1, for example, for operation power requirements of the vehicle 1 during starting, navigation and running. In another embodiment of the present application, the battery 10 can not only be used as the operating power source of vehicle 1, but also can be used as a driving power source of vehicle 1 to provide driving power for vehicle 1 instead of or partially instead of fuel or natural gas.

In order to meet different power requirements, the battery may include a plurality of battery cells. The plurality of battery cells may be in series connection, in parallel connection, or in parallel-series connection, and the parallel-series connection refers to mixing of the series connection and the parallel connection. The battery may also be called a battery pack. Optionally, the plurality of battery cells may be in series connection, in parallel connection, or in parallel-series connection to form a battery module first, and a plurality of battery modules may then be in series connection, in parallel connection, or in parallel-series connection to form a battery. That is, the plurality of battery cells may directly form a battery, or form a battery module first, and then the battery module forms a battery.

Figure 2:
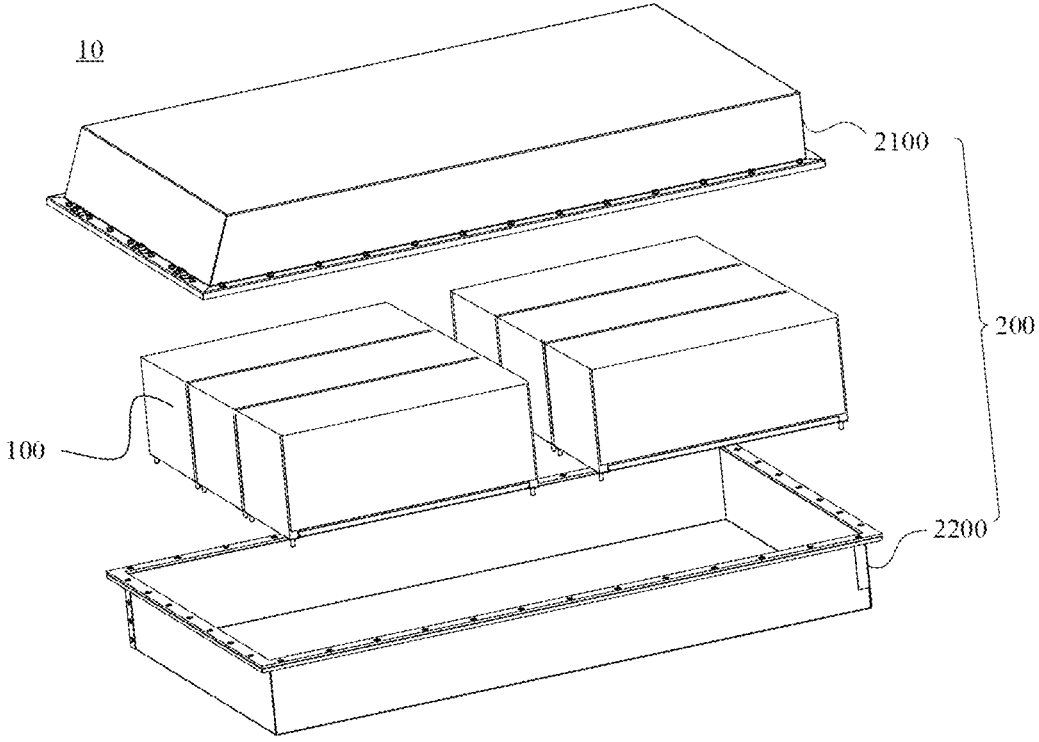
FIG. 2 is a schematic structural diagram of a battery according to an embodiment of the present application.

For example, FIG. 2 is a schematic structural diagram of a battery 10 according to an embodiment of the present application, where the battery 10 may include a plurality of battery cells 100. The battery 10 may further include a box body 200 (or a cover body), the interior of the box body 200 is of a hollow structure, and the plurality of battery cells 100 are accommodated in the box body 200. As shown in FIG. 2, the box body 200 may include two portions, which are referred to here as a first portion 2100 and a second portion 2200 respectively, the first portion 2100 and the second portion 2200 being engaged together. The shapes of the first portion 2100 and the second portion 2200 may be determined according to the combined shape of the plurality of battery cells 100, and the first portion 2100 and the second portion 2200 each have an opening. For example, the first portion 2100 and the second portion 2200 may each be a hollow cuboid with only one surface being an open surface, the opening of the first portion 2100 and the opening of the second portion 2200 are arranged opposite to each other, and the first portion 2100 and the second portion 2200 are mutually engaged to form box body 200 with a closed chamber. After the plurality of battery cells 100 are in series connection or in parallel connection or in a parallel-series connection, they are placed in the box body 200 formed after the first portion 2100 and the second portion 2200 are engaged together.

Optionally, the battery 10 may further include other structures, which will not be repeated here. For example, the battery 10 may further include a busbar component, and the busbar component is configured to realize an electrical connection between the plurality of battery cells 100, such as parallel connection or series connection or series-parallel connection. Specifically, the busbar component may realize an electrical connection between the battery cells 100 by connecting electrode terminals of the battery cells 100. Further, the busbar component may be fixed to the electrode terminals of the battery cells 100 by welding. The electrical energy of the plurality of battery cells 100 may further pass through the box by a conductive mechanism to be drawn out. Optionally, the conductive mechanism may also belong to the busbar component.

According to different power demands, the number of battery cells 100 may be set to any value. The plurality of battery cells 100 may be in series connection, or in parallel connection, or in series-parallel connection to achieve a larger capacity or power. Since each battery 10 may include a large number of battery cells 100, in order to facilitate the installation, the battery cells 100 may be divided in groups, and each group of battery cells 100 constitutes a battery module. The number of battery cells 100 included in the battery module is not limited, and can be set according to needs.

Figure 3:
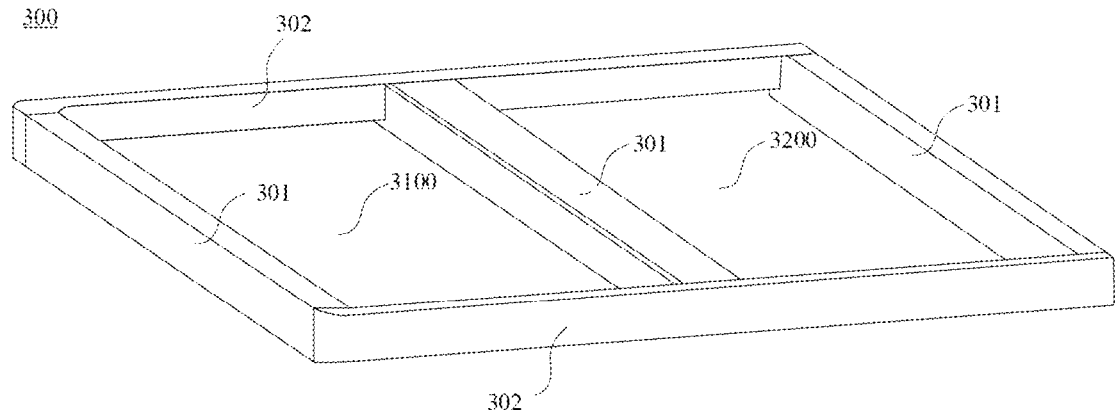
FIG. 3 is a schematic structural diagram of a holder body provided in a vehicle according to an embodiment of the present application.

In order to facilitate the installation of the battery 10 in the vehicle 1, FIG. 3 shows a schematic structural diagram of a holder body 300 provided in the vehicle 1. The box body 200 of the battery 10 described above can be mounted on the holder body 300, so that the battery 10 is mounted in the vehicle 1. in some embodiments, the holder body 300 may be disposed on a chassis of the vehicle 1 to facilitate the installation or replacement of the battery 10 that is disposed on the holder body 300. Alternatively, in other embodiments, the holder body 300 may also be disposed at other positions of the battery 10, which is not limited in this embodiment of the present application.

In an embodiment of the present application, the holder body 300 may include a plurality of beams, and the plurality of beams surround to form an accommodating space to accommodate at least one of the batteries 10, specifically, to accommodate at least one box body 200 of the at least one of the batteries 10, so that the at least one battery 10 is mounted in the vehicle 1.

Optionally, the holder body 300 may include at least one first beam 301 and a pair of second beams 302, wherein the pair of second beams 302 are opposite to each other, and the at least one first beam 301 is perpendicular to an extension direction of the second beam 302, and is connected to the pair of second beams 302.

As an example, in an embodiment shown in FIG. 3, the holder body 300 includes three first beams 301, wherein two first beams 301 are respectively connected to two ends of the pair of second beams 302, and the other first beam 301 is connected to the middle of the pair of second beams 302. Two symmetrical spaces, i.e., a first space 3100 and a second space 3200 can be formed between the three first beams 301 and the pair of second beams 302. The first space 3100 and the second space 3200 can be used for accommodating box bodies 200 of two batteries 10 respectively. The size of the first space 3100 and the second space 3200 may fit with the size of the box body 200, and thus may be designed correspondingly.

Of course, in other embodiments, the holder body 300 may also include other numbers of first beams 301. For example, the holder body 300 only includes one first beam 301 that is connected to the middle of the pair of second beams 302. In this embodiment, a space between the pair of second beams 302 may also be divided into two symmetrical spaces for accommodating box bodies 200 of two batteries 10. For another example, the holder body 300 may include two first beams 301, which are respectively connected to both ends of the pair of second beams 302, and are connected to each other to form a frame-shaped structure. A space in the frame-shaped structure is used for accommodating a box body 200 of one battery 10. For another example, the holder body 300 may further include four or more first beams 301, and a space between the pair of second beams 302 may be divided into three or more subspaces for correspondingly accommodating box bodies 200 of three or more batteries 10. In the embodiment of the present application, the specific number of the first beams 301 in the holder body 300 is not limited.

Optionally, in order to facilitate the installation of the holder body 300 in the vehicle 1, extension directions of the first beam 301 and the second beam 302 can be parallel to a length direction and a width direction of the vehicle 1, respectively, so as to save an installation space of the holder body 300 in the vehicle 1.

Figure 4:
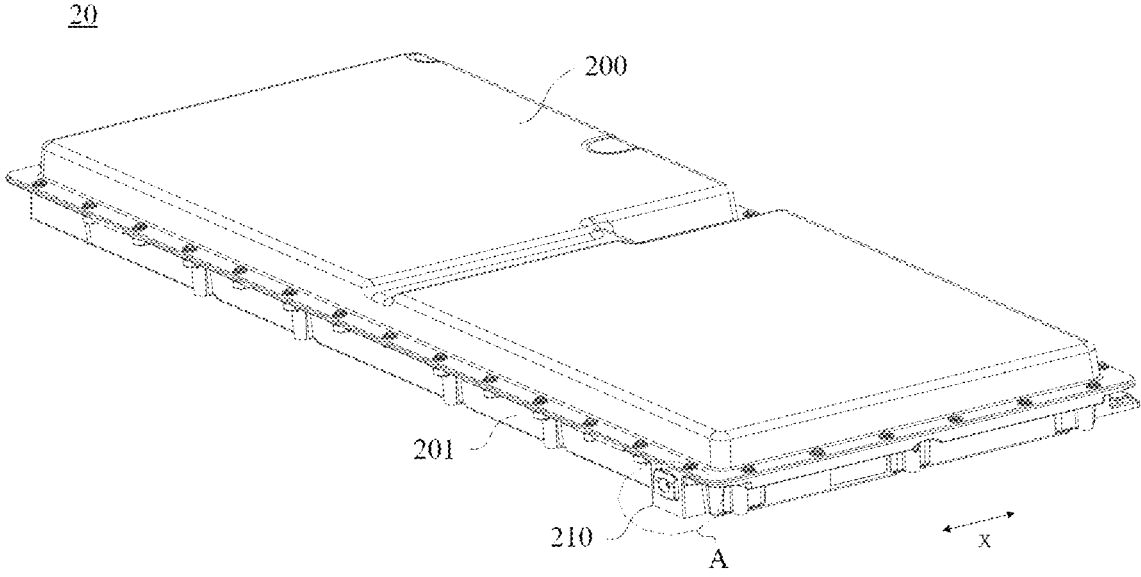
FIG. 4 is a schematic structural diagram of a battery box according to an embodiment of the present application.

On the basis of the embodiment of the present application shown in FIG. 2 above, FIG. 4 shows a schematic structural diagram of a box 20 of a battery 10 provided in an embodiment of the present application.

As shown in FIG. 4, the box 20 of the battery 10 includes a box body 200 for accommodating a battery cell 100; a first position-limit member 210 disposed on a side of a first wall 201 of the box body 200 away from the battery cell 100, wherein the first wall 201 is perpendicular to a first direction x, the first direction x is parallel to a traveling direction of an electrical apparatus after the box 20 is mounted on the electrical apparatus, and the first position-limit member 210 is used to limit a relative displacement of the box 20 in the first direction x.

As an example, the electrical apparatus in the embodiment of the present application may be the vehicle 1 described above. After the battery 10 is mounted in the vehicle 1, the first direction x may be parallel to the traveling direction of the vehicle 1. In some embodiments, the traveling direction of the vehicle 1 may be parallel to a length direction of the vehicle, that is, after the battery 10 is mounted in the vehicle 1, the first direction x may be parallel to the length direction of the vehicle 1.

Of course, in addition to the vehicle 1, the electrical apparatus in the embodiment of the present application may also be electrical apparatuses in other types, which may have a motion state, and every direction of the motion state may be referred to as the traveling direction of the embodiment of the present application.

In addition, with reference to FIGS. 2 and 4, the box body 200 in the embodiment of the present application may include the first portion 2100 and the second portion 2200 as described above, and the first wall 201 of the box body 200 may be a wall formed after the first portion 2100 and the second portion 2200 are engaged with each other. Therefore, in the embodiment of the present application, the first position-limit member 210 disposed on the first wall 201 can be independently disposed on the first portion 2100 of the box body 200, and can also be independently disposed on the second portion 2200 of the box body 200, and can also be two parts respectively disposed on the first portion 2100 and the second portion 2200 of the box body 200. As an example, in an embodiment shown in FIG. 4, the first position-limit member 210 is disposed on one portion of the box body 200.

In the embodiment of the present application, the first position-limit member 210 is disposed on a side of the first wall 201 of the box body 200 away from the battery cell 100. It can be understood that the battery cell 100 is accommodated in an internal cavity of the box body 200, and the side of the box body 200 close to the battery cell 100 can be understood as an inner side of the box body 200, correspondingly, the side of the box body 200 away from the battery cell 100 can be understood as an outer side of the box body 200. Therefore, the side of the first wall 201 of the box body 200 away from the battery cell 100 can be understood as the outer side of the first wall 201. After the box 20 is mounted in the electrical apparatus, the first position-limit member 210 disposed on the outer side of the first wall 201 is easy to act on the electrical apparatus to limit the relative displacement of the box 20 in the electrical apparatus.

Further, the first wall 201 provided with the first position-limit member 210 is perpendicular to the first direction x. After the box 20 is mounted on the electrical apparatus, the first position-limit member 210 can generate an acting force in the first direction with the electrical apparatus so as to limit the relative displacement of the box 20 in the electrical apparatus along the first direction x.

For a movable electrical apparatus, its main motion state may refer to a traveling state, and in the traveling state, its motion mode may change in various ways. For example, for a vehicle in a traveling state, it may have different motion states such as starting, accelerating, decelerating, and braking. In main and variable traveling states of the electrical apparatus, internal components of the electrical apparatus, such as batteries, are also greatly affected.

Based on the technical solution of the embodiment of the present application, the first position-limit member 210 is disposed on the side of the first wall 201 of the box body 200 of the battery box 20 away from the battery cell 100, the first wall 201 is perpendicular to the first direction x, and the first direction x is parallel to the traveling direction of the electrical apparatus after the box 20 is mounted on the electrical apparatus, so that after the box 20 is mounted on the electrical apparatus, the first position-limit member 210 can generate an acting force in the first direction x with the electrical apparatus, that is, the first position-limit member 210 can generate an acting force with the electrical apparatus in the traveling direction of the electrical apparatus and the direction opposite to the traveling direction, so as to limit a relative displacement of the box 20 in the traveling direction of the electrical apparatus and the direction opposite to the traveling direction and improve installation stability of the box 20 in the traveling direction of the electrical apparatus and the direction opposite to the traveling direction, thereby reducing influence of the electrical apparatus staying in a traveling state on the battery 10 and its box 20, and ensuring normal operations of the battery 10 and the electrical apparatus where the battery is located.

It should be noted that, for the first wall 201 in the embodiment of the present application, it may include a main body structure and an additional structure, wherein the main structure may be approximately understood as a wall-like structure, and part of a surface of the wall-like structure may be provided with an additional structure such as a protrusion or a recess, which facilitates arrangement of structural members related to the box 20 on the first wall 201. For the first position-limit member 210 in the embodiment of the present application, it may be directly disposed on the main body wall-like structure of the first wall 201, or the additional structure such as a protrusion or a recess on the main body wall-like structure. As an example, in an embodiment shown in FIG. 4, the first position-limit member 210 is disposed on an additional protruding portion, protruding to the outer side of the first wall 201 along the first direction x, of the main body wall-like structure in the first wall 201. For the convenience of description, the main body structure and the additional structure in the first wall 201 are not distinguished below, and are collectively referred to as the first wall 201.

Figure 5:
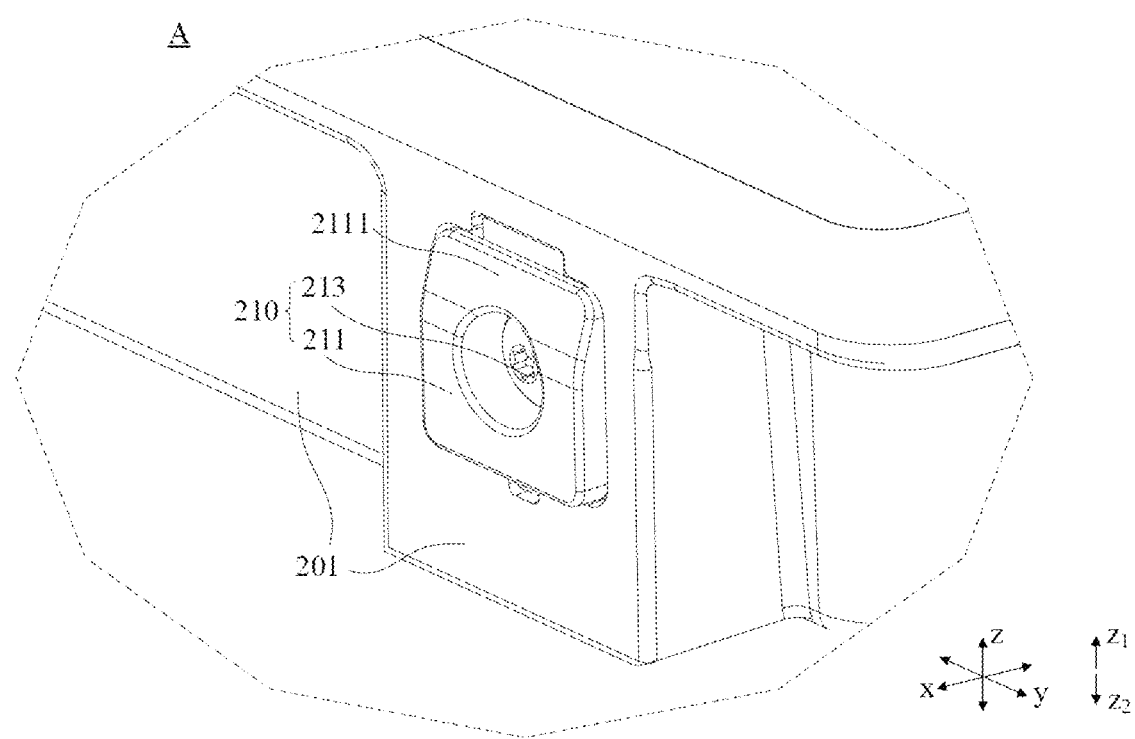
FIG. 5 is a schematic perspective view of a first position-limit member according to an embodiment of the present application.
Figure 6:
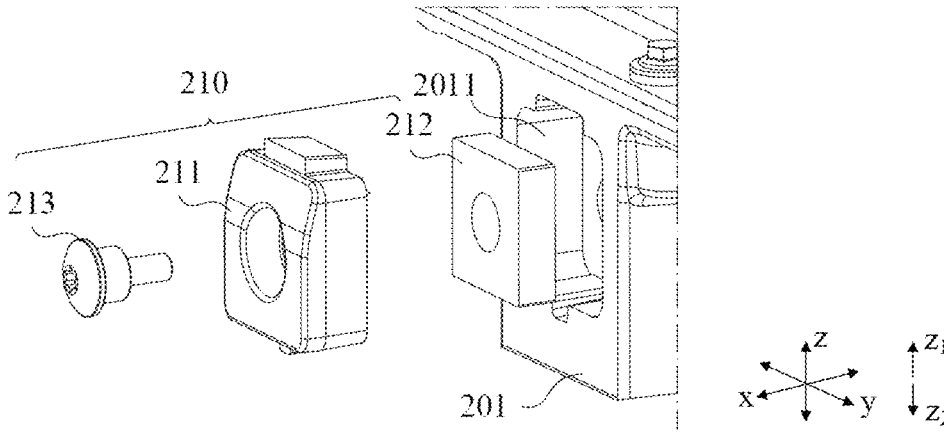
FIG. 6 is a schematic exploded view of a first position-limit member according to an embodiment of the present application.
Figure 7:
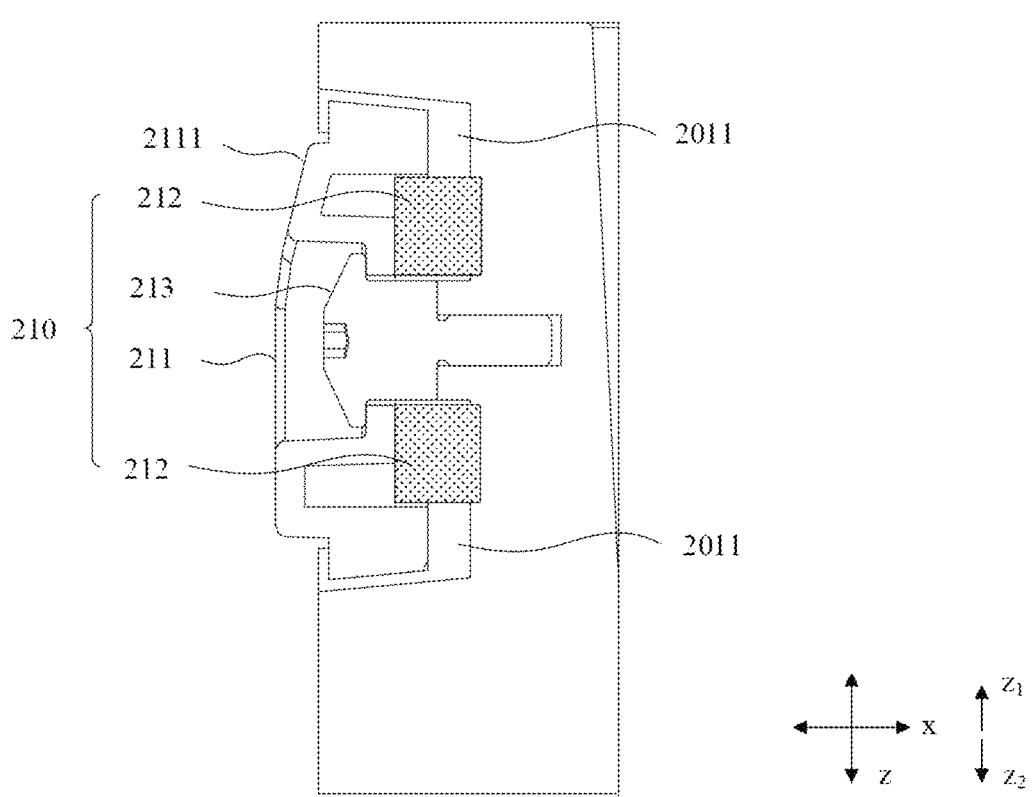
FIG. 7 is a schematic cross-sectional view of a first position-limit member according to an embodiment of the present application.

For the first position-limit member 210, FIG. 5 shows a schematic perspective view, and FIG. 5 may be a partial enlarged view of part A in FIG. 4. FIG. 6 shows a schematic exploded view of the first position-limit member 210. FIG. 7 shows a schematic cross-sectional view of the first position-limit member 210 along a plane xz in FIG. 5. The plane xz is a plane determined according to a direction x and a direction z, the direction x is the first direction in the foregoing embodiments of the present application, and the direction z is parallel to the first wall 201 and perpendicular to the direction x. After the box 20 is mounted on the electrical apparatus, the direction z may be parallel to the direction of gravity, wherein the direction z includes the opposite direction of gravity $z_1$ and the direction of gravity $z_2$. For ease of illustration and understanding, FIG. 5 and part of the following figures also show a direction y perpendicular to the direction x and the direction z, and the three directions are used to form a space rectangular coordinate system together.

As shown in FIG. 5 to FIG. 7, the first position-limit member 210 may include a first position-limit block 211 and a buffer block 212, the first position-limit block 211 is disposed on the first wall 201 and may be moved along the first direction x, the buffer block 212 is disposed between the first position-limit block 211 and the first wall 201, and the buffer block 212 is used to provide a buffer distance of the first position-limit block 211 in the first direction x.

Specifically, after the box 20 is mounted on the electrical apparatus, the first position-limit block 211 in the first position-limit member 210 acts with the electrical apparatus to prevent the relative displacement of the box. In order to ensure the wear resistance of the first position-limit block 211 and prolong its service life, the first position-limit block 211 may be made of a wear-resistant material. As an example, the wear-resistant material includes but is not limited to a Polyoxymethylene (POM) material with high mechanical strength and rigidity.

In order to facilitate the installation of the box 20 on the electrical apparatus, the first position-limit member 210 in the embodiment of the present application further includes the buffer block 212 that is disposed between the first position-limit block 211 and the first wall 201 and can provide the buffer distance of the first position-limit block 211 in the first direction x. In other words, the first position-limit block 211 in the embodiment of the present application is not fixed to the first wall 201, but can have a buffer distance in the first direction x through the arrangement of the buffer block 212.

Optionally, in the embodiment of the present application, the buffer distance provided by the buffer block 212 may be determined according to a thickness of the buffer block 212 in the first direction x. As an example, when the buffer block 212 stays in an original state, its thickness in the first direction is $d_1$, and when the buffer block stays in a maximum compressed state, its thickness in the first direction is $d_2$. Therefore, the buffer distance provided by the buffer block 212 may be less than or equal to a difference value between $d_1$ and $d_2$.

Optionally, the buffer block 212 may be made of an elastic material, and the elastic material includes, but is not limited to, a Polyurethane (PU) material. The PU material may be manufactured into foam or plastic sponge, so as to form the buffer block 212 in the embodiment of the present application.

Based on the technical solution of the embodiment of the present application, when mounting the box 20 on the electrical apparatus, the first position-limit block 211 can move toward the inside of the box 20 along the first direction x through the matching between the buffer block 212 and the first position-limit block 211, and the first position-limit block 211 can not bring too much installation resistance, facilitating the installation of the box 20 on the electrical apparatus. Further, after the box 20 is mounted on the electrical apparatus, the first position-limit block 211 compresses the buffer block 212, the buffer block 212 is then in a compressed state to provide an elastic acting force to the first position-limit block 211, so that the first position-limit block 211 is in closely press fit with the electrical apparatus in the direction x, thereby ensuring the installation stability of the box 20 in the first direction x, that is, ensuring the installation stability of the box 20 in the traveling direction of the electrical apparatus and the direction opposite to the traveling direction.

Optionally, with further reference to FIGS. 5 to 7, the first position-limit member 210 in the embodiment of the present application may further include a first fastener 213. The first position-limit block 211 may be disposed on the first wall 201 through the first fastener 213. The first fastener 213 is used to provide a buffer space for the first position-limit block 211 and the buffer block 212 in the first direction x.

Specifically, in the embodiment of the present application, the first position-limit block 211 is not directly fixed to the first wall 201 by means of the first fastener 213, the first position-limit block 211 is disposed on the first wall 201 in a position-limiting manner, and a buffer space in the first direction x is provided for the first position-limit block 211 and the buffer block 212. When mounting the box 20 on the electrical apparatus, the first position-limit block 211 can generate a relative displacement in the first direction x through the buffer block 212.

As an example, the first fastener 213 in the embodiment of the present application includes, but is not limited to, a bolt. One end of the bolt is fixed to the first wall 201. In the first direction x, a certain buffer space is provided between the head of the bolt and the first wall 201, and the first position-limit block 211 and the buffer block 212 are disposed in the buffer space between the head of the bolt and the first wall 201. When mounting the box 20 on the electrical apparatus, the first position-limit block 211 can generate a relative displacement between the head of the bolt and the first wall 201 through the buffer block 212 in the first direction x.

In an embodiment shown in FIG. 6, the first fastener 213 may be a stepped bolt, and the stepped bolt has a stepped structure, wherein a first step is fixed to the first wall 201, and a second step and the head of the bolt match with the first position-limit block 211 and the buffer block 212, so that a buffer space is provided for the first position-limit block 211 and the buffer block 212.

Specifically, before the box 20 is mounted on the electrical apparatus, under the action of the first fastener 213 and the first position-limit block 211, the buffer block 212 stays in a first state, which may refer to an originally uncompressed state, or a slightly compressed state. When the buffer block 212 stays in the first state, its thickness in the first direction is $d_3$, and when the buffer block 212 stays in a maximum compressed state, its thickness in the first direction is $d_2$, then in the embodiment of the present application, a buffer distance provided by the buffer block 212 for the first position-limit block 211 may be a difference value between $d_3$ and $d_2$. The first fastener 213 is used to determine the first state of the buffer block 212 and limit the buffer distance of the first position-limit block 211 in the first direction x through the first state of the buffer block 212.

Based on the technical solution of the embodiment of the present application, the first position-limit block 211 is disposed on the first wall 201 of the box body 200 by using the first fastener 213, and a buffer space is provided for the first position-limit block 211 and the buffer block 212, so that the first position-limit block 211 can generate a relative displacement in the first direction x through the buffer block 212. Therefore, the first position-limit block 211 does not bring too much installation resistance, facilitating the installation of the box 20 on the electrical apparatus. After the box 20 is mounted on the electrical apparatus, the matching between the first position-limit block 211 and the buffer block 212 can ensure the installation stability of the box 20 in the first direction, that is, can ensure the installation stability of the box 20 in the traveling direction of the electrical apparatus and the direction opposite to the traveling direction Optionally, as shown in FIG. 5 and FIG. 6, in the embodiment of the present application, the overall shape of the first position-limit block 211 may be similar to a block, with a mounting position provided in the middle; the first fastener 213 passes through the mounting position in the middle of the first position-limit block 211 so as to restrict the first position-limit block 211 to the first wall 201. Compared with the manner of providing the first fastener 213 at other positions of the first position-limit block 211, the manner in this embodiment can achieve a better fixing and position-limiting effect. Of course, under certain application scenarios or requirements, the first fastener 213 may also be disposed at other positions of the first position-limit block 211, in order to provide a buffer space for the first position-limit block 211 and the buffer block 212, as long as the first position-limit block 211 may have a relative displacement in the first direction x through the buffer block

212. The specific position of the first fastener 213 is not limited in the embodiment of the present application.

In addition, optionally, as shown in FIG. 6, in the embodiment of the present application, the overall shape of the buffer block 212 may also be approximately a block-like structure, which can expand the contact area between the buffer block 212 and other components and improve the installation stability of the buffer block. In addition, a through hole is correspondingly formed in the middle of the buffer block 212, and the buffer block 212 is disposed on the first wall 201 by the first fastener 213 that passes through the through hole.

Optionally, in some application scenarios, the box 20 can be mounted on the electrical apparatus facing toward the opposite direction of gravity $z_1$, for example, the electrical apparatus is the vehicle 1, and the box 20 can be lifted and mounted on the chassis of the vehicle 1, that is, the box 20 is mounted on the vehicle 1 facing toward the opposite direction of gravity $z_1$.

In this application scenario, as shown in FIGS. 5 to 7, a first end 2111 of the first position-limit block 211 in the embodiment of the present application may be provided with a wedge angle, and the first end 2111 of the first position-limit block 211 is an end of the first position-limit block 211 facing toward the opposite direction of gravity $z_1$. In this way, when the box 20 is mounted on the electrical apparatus facing toward the opposite direction of gravity $z_1$, the first end 2111 with the wedge angle in the first position-limit block 211 can be gradually moved in the opposite direction of gravity $z_1$, and the first end 2111 can be used for guiding and positioning of the box 20 when mounting the box 20 in the electrical apparatus, so that the box 20 can be mounted in the electrical apparatus more conveniently.

Optionally, referring further to FIG. 6 and FIG. 7, in the embodiment of the present application, the first wall 201 is provided with an accommodating area 2011, and the accommodating area 2011 can be used for accommodating the first position-limit member 210.

Specifically, the accommodating area 2011 can fit with the first position-limit member 210. For example, the accommodating area 2011 may include a quadrilateral recess to suitably accommodate the first position-limit block 211 in the first position-limit member 210. For another example, in the first direction x, a depth of the quadrilateral recess needs to be greater than a thickness of the buffer block 212, so that the quadrilateral recess can have a space for accommodating the buffer block 212. For another example, if the first fastener 213 is a bolt, the accommodating area 2011 may further include a bolt hole to adapt to mounting of the bolt.

Based on the technical solution of the embodiment of the present application, the first wall 201 of the box 20 is provided with the accommodating area 2011 for accommodating the first position-limit member 210; on the one hand, a mounting space for the first position-limit member 210 can be saved, and on the other hand, the first position-limit member 210 can also be protected by the accommodating area 2011, and is prevented from being damaged by external influences, so that service life of the first position-limit member 210 in the box 20 is prolonged.

Figure 8:
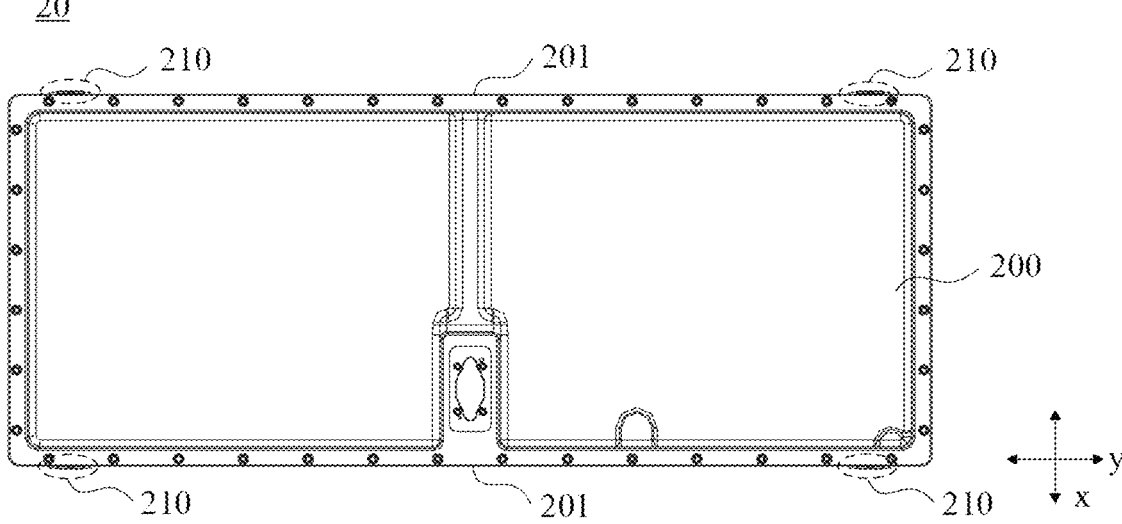
FIG. 8 is a schematic plan view of a battery box according to an embodiment of the present application.

FIG. 8 shows a schematic plan view of a box 20 of a battery 10, along a plane xy, provided in an embodiment of the present application.

Optionally, as shown in FIG. 8, the box 20 may include a plurality of first position-limit members 210 described above, and the plurality of first position-limit members 210 may be distributed on two first walls 201 in the box body 200 that are parallel to each other.

Specifically, after the box 20 is mounted on the electrical apparatus, the two first walls 201 are both perpendicular to the first direction x, that is, perpendicular to the traveling direction of the electrical apparatus. According to the embodiment of the present application, using a space of the two first walls 201, the plurality of first position-limit members 210 are distributed on the two first walls 201, the first position-limit members 210 on the two first walls 201 of the box 20 each can generate an acting force in the first direction x with the electrical apparatus, so that the box 20 can be clamped with the electrical apparatus in the first direction x, to further limit the relative displacement of the box 20 in the electrical apparatus along the first direction x, thereby improving the installation stability of the box 20 in the electrical apparatus.

It should be noted that, in the present application, the two first walls 201 parallel to each other can be understood as two first walls 201 of the main body wall-like structure that are parallel to each other, and being parallel to each other does not mean being absolutely parallel, but also means being approximately parallel.

Optionally, the number of the first position-limit members 210 disposed on the two first walls 201 may be equal or different. Optionally, a plurality of first position-limit members 210 may be arranged and distributed on the first wall 201 along the direction y.

As an example, one first wall 201 may be provided with two first position-limit members 210, and the two first position-limit members 210 may be distributed in both end regions of the one first wall 201 in the direction y, that is, distributed at two corners of the box body 200. The other first wall 201 may be provided with only one first position-limit member 210, and the one first position-limit member 210 may be disposed in the central area of the other first wall 201 in the direction y.

As another example, as shown in FIG. 8, each first wall 201 of the two first walls 201 in the direction y is provided with one first position-limit member 210 at each end, that is, four first position-limit members 210 are distributes at four corners of the box body 200.

Based on the technical solution of the embodiment of the present application, the plurality of first position-limit members 210 provided in the box 20 are distributed at the four corners of the box body 200 to limit relative displacements of the four corners of the box 20 in the electrical apparatus, thereby comprehensively improving the installation stability of the box 20 in the electrical apparatus.

Figure 9:
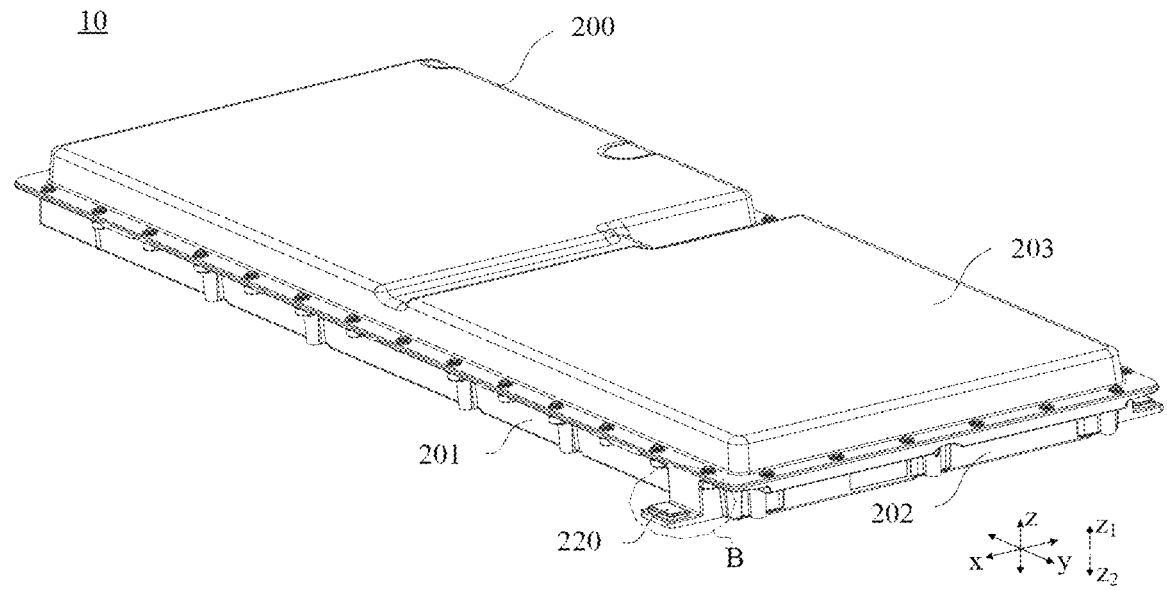
FIG. 9 is a schematic structural diagram of a battery box according to an embodiment of the present application.

FIG. 9 shows another schematic structural diagram of a box 20 of a battery 10 provided in an embodiment of the present application.

Optionally, as shown in FIG. 9, the box 20 of the battery 10 provided in the embodiment of the present application may include a second position-limit member 220, and the second position-limit member 220 is disposed on a side of the box body 200 away from the battery cell to limit a relative displacement of the box 20 in the second direction z. After the box 20 is mounted on the electrical apparatus, the second direction z is parallel to the direction of gravity.

It can be understood that the battery cell 100 is accommodated in an internal cavity of the box body 200, and the side of the box body 200 close to the battery cell 100 can be understood as an inner side of the box body 200, correspondingly, the side of the box body 200 away from the battery cell 100 can be understood as an outer side of the box body 200. Therefore, in the embodiment of the present application, the second position-limit member 220 is disposed on the outer side of the box body 200. After the box

20 is mounted on the electrical apparatus, the second position-limit member 220 can be used to limit the relative displacement of the box 20 in the direction z, that is, to limit the relative displacement of the box 20 in the direction of gravity $z_2$ and the opposite direction of gravity $z_1$.

Based on the technical solution of the embodiment of the present application, the second position-limit member 220 is disposed on one side of the box body 200 of the battery box 20 away from the battery cell 100, the second position-limit member 220 can generate an acting force with the electrical apparatus in the second direction z after the box 20 is mounted on the electrical apparatus, that is, the second position-limit member 220 can generate an acting force in the direction of gravity $z_2$ and the opposite direction of gravity $z_1$ with the electrical apparatus, so as to limit the relative displacement of the box 20 in the direction of gravity $z_2$ and the opposite direction of gravity $z_1$, thereby further improving the installation stability of the box 20 in the electrical apparatus and ensuring normal operations of the battery 10 and the electrical apparatus where the battery is located.

Optionally, the second position-limit member 220 provided in the embodiment of the present application may be disposed on the outer side of any wall of the box body 200, so that after the box 20 is mounted on the electrical apparatus, the second position-limit member 220 can abut against the electrical apparatus and generate an acting force in the direction of gravity $z_2$ and the opposite direction of gravity $z_1$ with the electrical apparatus. In the embodiment of the present application, the specific position of the second position-limit member 220 outside the box body 200 is not limited.

Figure 10:
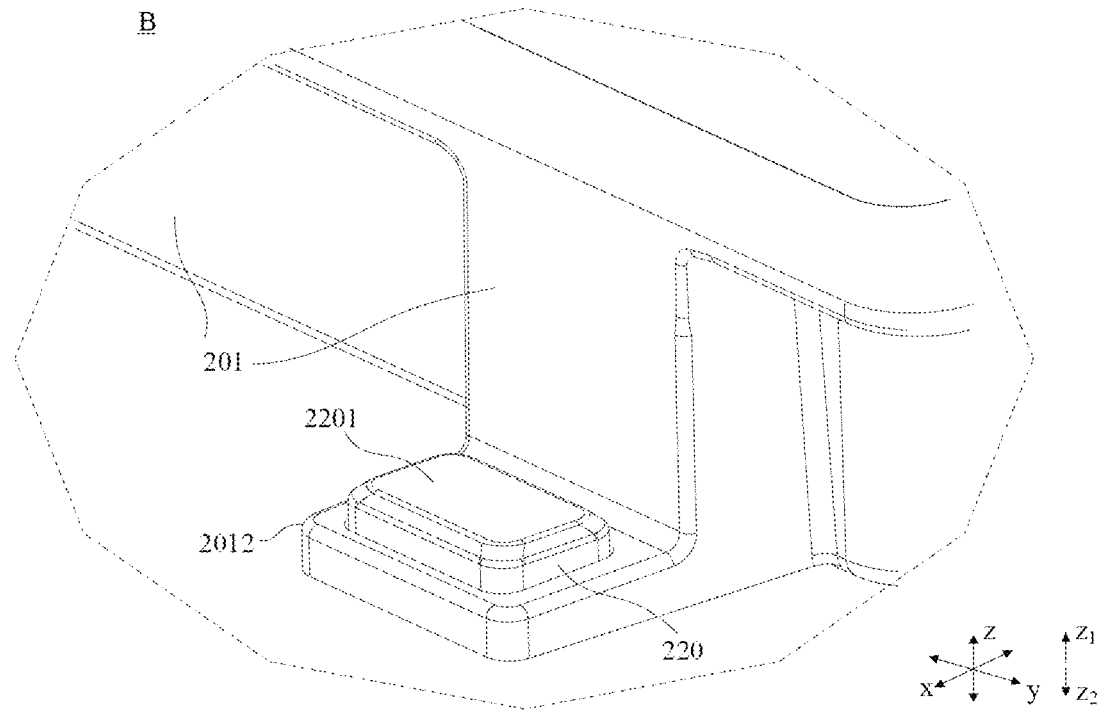
FIG. 10 is a schematic perspective view of a second position-limit member according to an embodiment of the present application.
Figure 11:
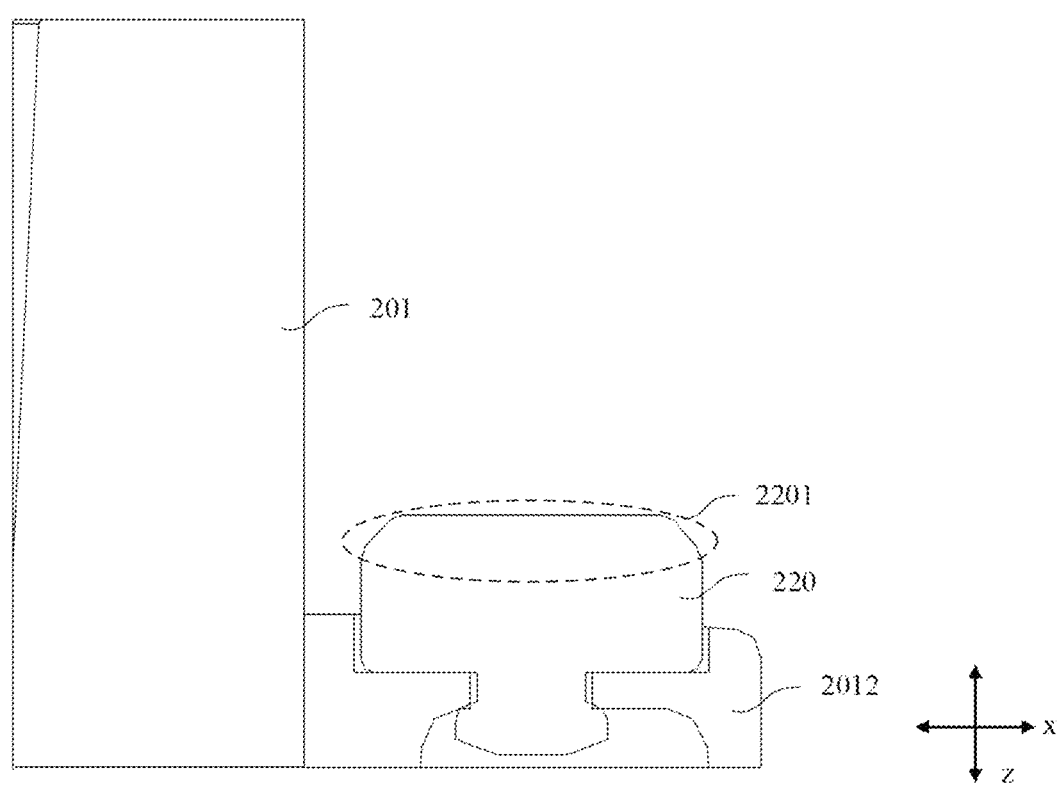
FIG. 11 is a schematic cross-sectional view of a second position-limit member according to an embodiment of the present application.

As an example, in an embodiment shown in FIG. 9, the second position-limit member 220 may also be disposed on the first wall 201 of the box body 200 in the foregoing embodiments of the present application. In this case, FIG. 10 shows a schematic perspective view of a second position-limit member 220, and FIG. 10 may be a partial enlarged view of part B in FIG. 9. FIG. 11 shows a schematic cross-sectional view of the second position-limit member 220 along a plane xz in FIG. 10.

As an example, in the embodiment shown in FIGS. 10 and 11, the first wall 201 may include an extending portion 2012. The extending portion 2012 extends away from the battery cell 100 in the box body 200 along the first direction x, and the extending portion 2012 is used for arrangement of the second position-limit member 220 described above.

Specifically, the first wall 201 includes the extending portion 2012 extending along the first direction x and toward the outside of the box body 200, so that after the second position-limit member 220 is mounted on the extending portion 2012, it can be disposed opposite to the electrical apparatus in the second direction z, and the second position-limit member 220 and the electrical apparatus can be engaged with each other in the second direction z.

In addition, it can be understood that referring back to FIG. 9, in addition to the first wall 201, the box body 200 may further include a second wall 202 perpendicular to a third direction y (i.e., the direction y shown in the figure). If the second position-limit member 220 is disposed on the second wall 202, the second wall 202 may also include an extending portion for arrangement of the second position-limit member 220, and the extending portion of the second wall 202 may extend to the outside of the box body 200 along the direction y.

It can also be understood that, in addition to the first wall 201 and the second wall 202, the box body 200 may also include a third wall 203 perpendicular to the second direction z. In this case, the second position-limit member 220 can be directly disposed on the outer side of the third wall 203, so as to be able to engage with the electrical apparatus.

Optionally, in some embodiments, the second position-limit member 220 may be an elastic position-limit block, the elastic position-limit block is compressed to abut against the electrical apparatus after the box 20 is mounted on the electrical apparatus, so that there is an elastic force between the elastic position-limit block staying in a compressed state and the electrical apparatus; moreover, the elastic position-limit block is in closely press fit with the electrical apparatus in the second direction z, thereby ensuring the installation stability of the box 20 in the second direction z, that is, ensuring the Installation stability of the box 20 in the direction of gravity $z_2$ and the opposite direction of gravity $z_1$ of the electrical apparatus.

Optionally, the material of the elastic position-limit block in the embodiment of the present application includes but is not limited to a rubber material, which not only has elasticity, but also has certain wear resistance and strength. After the elastic position-limit block made of the rubber material is mounted onto the electrical apparatus, it has a little impact on the electrical apparatus, the installation stability between the box 20 and the electrical apparatus is ensured, wear on the electrical apparatus due to vibration of the box 20 can also be avoided, and the risk of corrosion of the electrical apparatus is reduced.

Optionally, in order to stabilize the installation of the box 20 in the electrical apparatus, after the box 20 is mounted on the electrical apparatus, the compression amount of the elastic position-limit block can be above a specific threshold value, so as to ensure an acting force between elastic position-limit block and the electrical apparatus being above a specific threshold value. As an example, the threshold value of the compression amount of the elastic position-limit block may be or above 3 mm.

Optionally, in the embodiment shown in FIG. 10 and FIG. 11, on the basis that the second position-limit member 220 is an elastic position-limit block, a first end 2201 of the elastic position-limit block is provided with a chamfer structure, and the first end 2201 of the elastic position-limit block is an end of the elastic position-limit block facing toward the opposite direction of gravity $z_1$.

When the box 20 is mounted on the electrical apparatus in the opposite direction of gravity $z_1$, the first end 2201 of the elastic position-limit block facing toward the opposite direction of gravity is in contact with the electrical apparatus first, and acts on the electrical apparatus; based on the technical solution of the embodiment of the present application, the first end 2201 of the elastic position-limit block is provided with the chamfer structure, which can facilitate compressing the first end 2201 of the elastic position-limit block to the electrical apparatus; besides, compared with a sharp-edge structure, the chamfer structure can avoid a stress concentration, thereby prolonging service life of the elastic position-limit block. In addition, the chamfer structure can also beautify the elastic position-limit block.

In addition, as an example, FIG. 10 and FIG. 11 show an installation manner of the second position-limit member 220 on the extending portion 2012.

Optionally, the extending portion 2012 includes an accommodating area for accommodating the second position-limit member 220, so that the second position-limit member 220 can be mounted on the extending portion 2012. Further, if the second position-limit member 220 is an elastic position-limit block, the elastic position-limit block has a protruding portion toward the extending portion 2012, and the extending portion 2012 has a clamping recess that matches with the protruding portion, so that the elastic position-limit block can be stably mounted on the extending portion 2012.

Of course, in addition to the installation manner in the embodiment shown in FIG. 10 and FIG. 11, the second position-limit member 220 can also be mounted on the extending portion 2012 in any other manner, for example, mounted on the extending portion 2012 through a fastener. The embodiment of the present application does not specifically limit thereto.

Optionally, the center of the first position-limit member 210 and the center of the second position-limit member 220 are located on a first plane, and the first plane is parallel to a plane determined by the first direction x and the second direction z, that is, the plane xz.

In some embodiments, the center of the first position-limit member 210 may be understood as the geometric center or the center of gravity of any module in the first position-limit member 210. For example, the center of the first position-limit member 210 may be the geometric center or center of gravity of the first position-limit block 211 described above. Similarly, the center of the second position-limit member 220 can also be understood as the geometric center or the center of gravity of any module in the second position-limit member 220. For example, the center of the second position-limit member 220 may be the geometric center or center of gravity of the elastic position-limit block described above.

Figure 12:
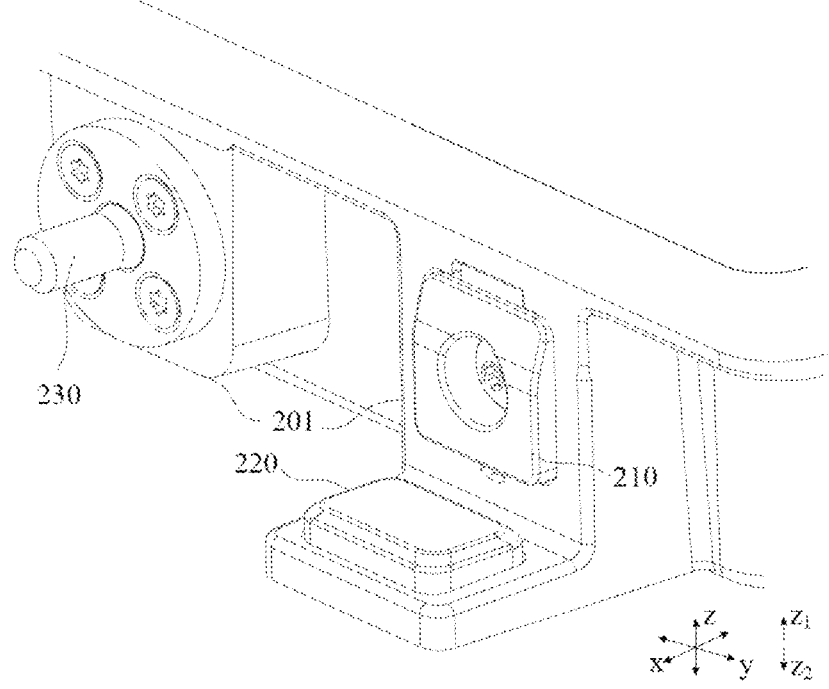
FIG. 12 is a schematic perspective view of a first position-limit member and a second position-limit member according to an embodiment of the present application.

In this case, FIG. 12 shows a schematic perspective view of a first position-limit member 210 and a second position-limit member 220 in an embodiment of the present application.

In the embodiment shown in FIG. 12, the first position-limit member 210 and the second position-limit member 220 are both disposed on the first wall 201 of the box body 200, and the first position-limit member 210 and the second position-limit member 220 are adjacently arranged. Specifically, the first position-limit member 210 may be disposed in a first region of the first wall 201, and the second position-limit member 220 may be disposed on the extending portion 2012, extending toward the outside of the box 20 along the first direction x, in the first region. In addition, in this embodiment, the center of the first position-limit member 210 and the center of the second position-limit member 220 are located on a first plane, and the first plane is parallel to the plane xz.

In addition to the manner as shown in the embodiment in FIG. 12 that the first position-limit member 210 and the second position-limit member 220 are disposed on the same first wall 201 of the box body 200, the first position-limit member 210 can be disposed on one first wall 201 in the box body 200, and the second position-limit member 220 can be symmetrically disposed on the other first wall 201 in the box body 200, where the center of the first position-limit member 210 and the center of the second position-limit member 220 may be located on the first plane that is parallel to the plane xz.

Based on the technical solution of the embodiment of the present application, the center of the first position-limit member 210 and the center of the second position-limit member 220 are both located on the first plane that is parallel to the plane xz. After the box 20 is mounted on the electrical apparatus, an acting force between the first position-limit member 210 and the electrical apparatus as well as an acting force between the second position-limit member 220 and the electrical apparatus is concentrated on the same plane, further improving the installation stability of the box 20 in the electrical apparatus. Further, if the first position-limit member 210 and the second position-limit member 220 are adjacently arranged on the same first wall 201, the acting force between the first position-limit member 210 and second position-limit member 220 and the electrical apparatus is more concentrated, so that the installation stability of the box 20 in the electrical apparatus can be further improved; moreover, the first position-limit member 210 and the second position-limit member 220 are adjacently arranged, which also facilitates the installation and maintenance of the first position-limit member 210 and the second position-limit member 220.

Further, as shown in FIG. 12, the box 20 may further include a first mounting member 230, which is disposed on a side of the first wall 201 of the box body 200 away from the battery cell, that is, disposed on the outer side of the first wall 201 of the box body 200. The first mounting member 230 is used to secure the box 20 to the electrical apparatus, and the first position-limit member 210 can be disposed adjacent to the first mounting member 230.

As an example, in the embodiment shown in FIG. 12, the first mounting member 230 may be a locking portion. Correspondingly, a locking mechanism and a channel may be provided in the electrical apparatus. The locking portion is configured to move in the channel. The locking mechanism is configured to lock the locking portion when the locking portion moves to a predetermined position of the channel, so that the box 20 can be secured on the electrical apparatus. In addition, the locking mechanism may also be configured to release the locking portion, and the locking portion is released from the channel so that the box 20 is released from the electrical apparatus.

When the box 20 is mounted on the electrical apparatus through the first mounting member 230, the first position-limit member 210 can generate an acting force with the electrical apparatus in the traveling direction of the electrical apparatus and the direction opposite to the traveling direction, so as to limit the box 20, and especially to limit a relative displacement of a component located around the first position-limit member 210 in the box 20 in the traveling direction of the electrical apparatus and the direction opposite to the traveling direction. Therefore, the component located around the first position-limit member 210 in the box 20 has a high stability. Based on the technical solution of the embodiment of the present application, the first mounting member 230 for securing the box 20 and the first position-limit member 210 are adjacently arranged, which can improve the stability of the first mounting member 230, thereby further improving the installation stability of the box 20 in the electrical apparatus.

In addition, it can be understood that, as shown in FIG. 12, if the second position-limit member 220 and the first position-limit member 210 are adjacently arranged, the second position-limit member 220 and the first mounting member 230 are also adjacently arranged, so that the installation stability of the first mounting member 230 and the box 20 can be further improved.

Figure 13:
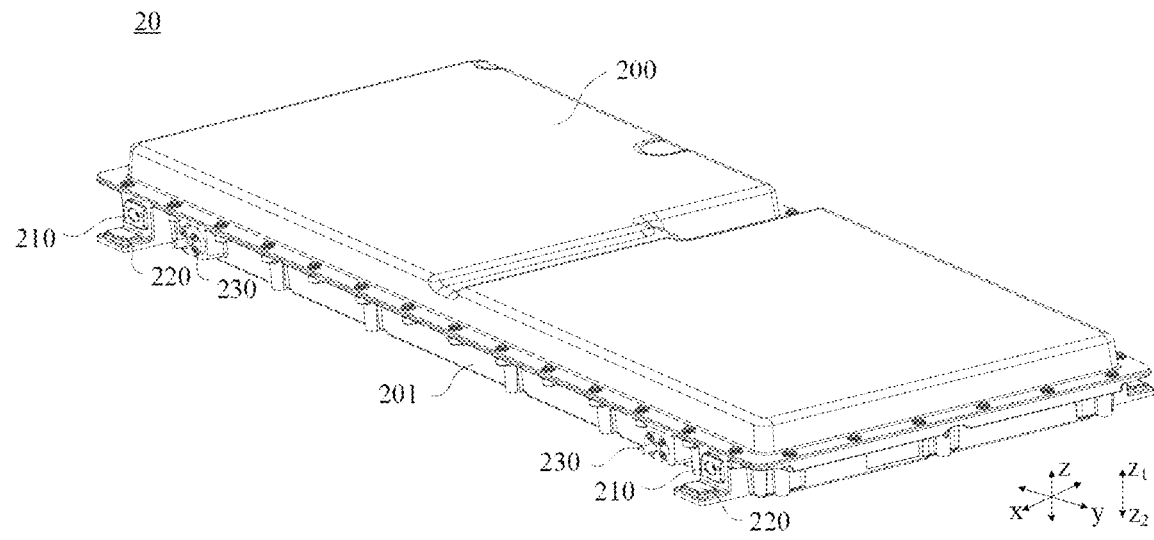
FIG. 13 is a schematic structural diagram of a battery box according to an embodiment of the present application.
Figure 14:
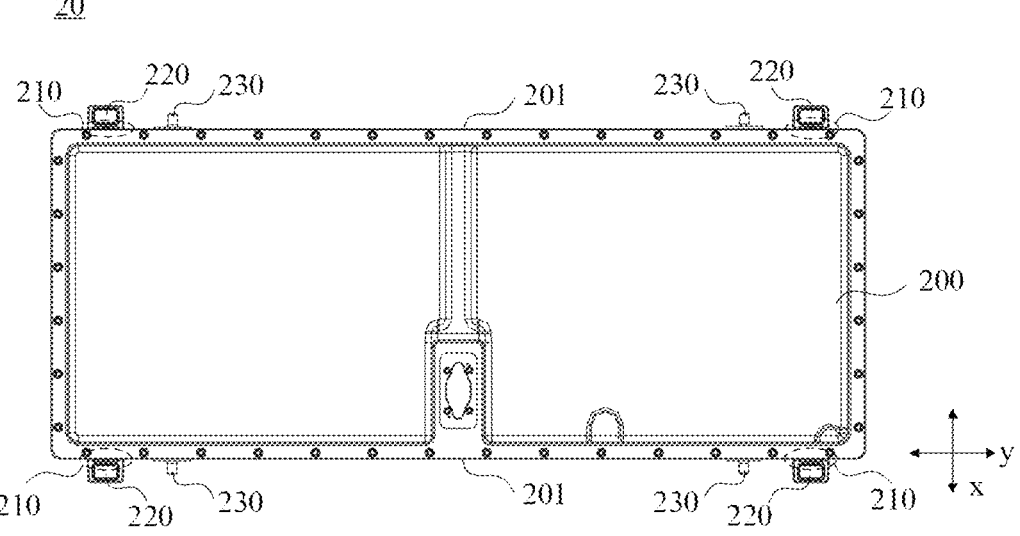
FIG. 14 is a schematic plan view of a battery box according to an embodiment of the present application.

In this embodiment, FIG. 13 shows a schematic perspective view of a box 20 of a battery 10. FIG. 14 shows a schematic plan view of the box 20 in FIG. 13 along a plane xy.

As shown in FIG. 13 and FIG. 14, the box 20 may include a plurality of first position-limit members 210 and a plurality of the second position-limit members 220 described above. The plurality of first position-limit members 210 may be distributed on two first walls 201 in the box body 200 that are parallel to each other, and the plurality of second position-limit members 220 and the plurality of first position-limit members 210 are in one-to-one correspondence and are adjacently arranged.

Optionally, the box 20 further includes a plurality of first mounting pieces 230 described above, and the plurality of first mounting members 230 can be distributed at four corners of the box body 200 to ensure the stability of the box 20 in locking installation.

As an example, in an embodiment shown in FIG. 14, the plurality of first mounting members 230 are distributed at the four corners of the box body 200 and are disposed on two first walls 201 that are parallel to each other. Further, the plurality of first mounting members 230 may be adjacently disposed and correspond to the first position-limit members 210 and the second position-limit members 220, so that the first position-limit members 210 and the second position-limit members 220 can ensure the installation stability of the first mounting member 230 and the box 20.

The related technical solutions of the box 20 of the battery 10 provided in the embodiment of the present application are described above with reference to FIGS. 4 to 14, and the related technical solutions of the holder 30 for mounting the box 20 of the battery 10 provided in the embodiment of the present application are described below with reference to FIGS. 15 to 24.

Figure 15:
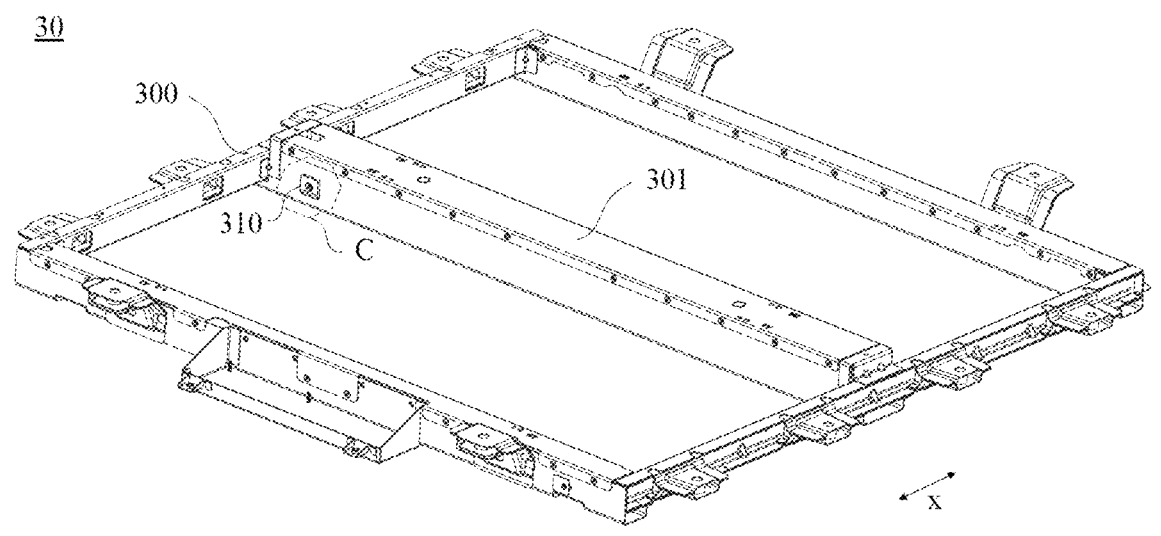
FIG. 15 is a schematic structural diagram of a holder according to an embodiment of the present application.

On the basis of the embodiment of the present application shown in FIG. 3 above, FIG. 15 shows a schematic structural diagram of a holder 30 provided in an embodiment of the present application, and the holder 30 can be applied to an electrical apparatus. The electrical apparatus may be the electrical apparatus mentioned in the embodiments shown in FIG. 4 to FIG. 14, and the electrical apparatus includes but is not limited to the vehicle 1 shown in FIG. 1 above.

As shown in FIG. 15, the holder 30 includes a holder body 300 for mounting the box 20 of the battery 10 of the electrical apparatus, the box 20 being used for accommodating a battery cell 100; and a third position-limit member 310 disposed on a side of a first beam 301 of the holder body 300 close to the box 20, wherein an extension direction of the first beam 301 is perpendicular to a first direction x, the first direction x is parallel to a traveling direction of the electrical apparatus, and the third position-limit member 310 is used to limit a relative displacement of the box 20 in the first direction x.

Specifically, for the related technical solutions of the holder body 300 and the first beam 301 in the embodiment of the present application, reference may be made to the related description of the embodiment shown in FIG. 3 above. The box of the battery 10 being mounted on the electrical apparatus in FIGS. 4 to 14 above can be understood as the box of the battery 10 being mounted on the holder 30 in the following embodiments of the present application, and specifically being mounted on the holder body 300 in the holder 30.

In addition, in the embodiment of the present application, an extension direction of the first beam 301 in the holder body 300 is perpendicular to the first direction x, and the first direction x is parallel to the traveling direction of the electrical apparatus. If the traveling direction of the electrical apparatus is a length direction of the electrical apparatus, in the embodiment of the present application, the extension direction of the first beam 301 is perpendicular to the length direction of the electrical apparatus, that is, parallel to a width direction of the electrical apparatus.

Further, in the embodiment of the present application, a third position-limit member 310 is disposed on a side of the first beam 301 close to the box 20, and the third position-limit member 310 is used to limit a relative displacement of the box 20 in the first direction x.

For ease of understanding, in the embodiment of the present application, the side of the first beam 301 close to the box 20 may also be referred to as an inner side of the first beam 301, and the inner side of the first beam 301 may be used to form a space for accommodating the box 20.

Specifically, after the box 20 of the battery 10 is mounted and accommodated in the holder body 300, the third position-limit member 310 disposed on the inner side of the first beam 301 is easy to engage with the box 20, thereby limiting relative displacements of the box 20 and the battery 10 located therein in the electrical apparatus.

Further, the extension direction of the first beam 301 provided with the third position-limit member 310 is perpendicular to the first direction x. After the box 20 is mounted and accommodated in the holder body 300, the third position-limit member 310 can generate an acting force with the box 20 in the first direction x so as to limit a relative displacement of the box 20 in the first direction x in the holder body 300.

Based on the technical solution of the embodiment of the present application, the third position-limit member 310 is disposed on a side of the first beam 301 of the holder body 300 of the holder 30 close to the box 20 of the battery 10, the extension direction of the first beam 301 is perpendicular to the first direction x, and the first direction x is parallel to the traveling direction of the electrical apparatus, so that after the box 20 of the battery 10 is mounted on the holder body 300 of the electrical apparatus, the third position-limit member 310 can generate an acting force in the first direction x with the box 20, that is, the third position-limit member 310 can generate an acting force with the box 20 in the traveling direction of the electrical apparatus and the direction opposite to the traveling direction, so as to limit the relative displacement of the box 20 in the traveling direction of the electrical apparatus and the direction opposite to the traveling direction and improve installation stability of the box 20 in the traveling direction of the electrical apparatus and the direction opposite to the traveling direction, thereby reducing influence of the electrical apparatus in a traveling state on the battery 10 and its box 20, and ensuring normal operations of the battery 10 and the electrical apparatus where the battery is located.

Optionally, in the embodiment of the present application, after the box 20 of the battery 10 is mounted on the holder 30 of the electrical apparatus, the third position-limit member 310 disposed on the holder body 300 may match with the first position-limit member 210 disposed on the box body 200 in the foregoing embodiments of the present application, the third position-limit member 310 and the first position-limit member 210 can generate an acting force in the traveling direction of the electrical apparatus and the direction opposite to the traveling direction to limit the relative displacement of the box 20 in the traveling direction of the electrical apparatus and the direction opposite to the traveling direction.

Figure 16:
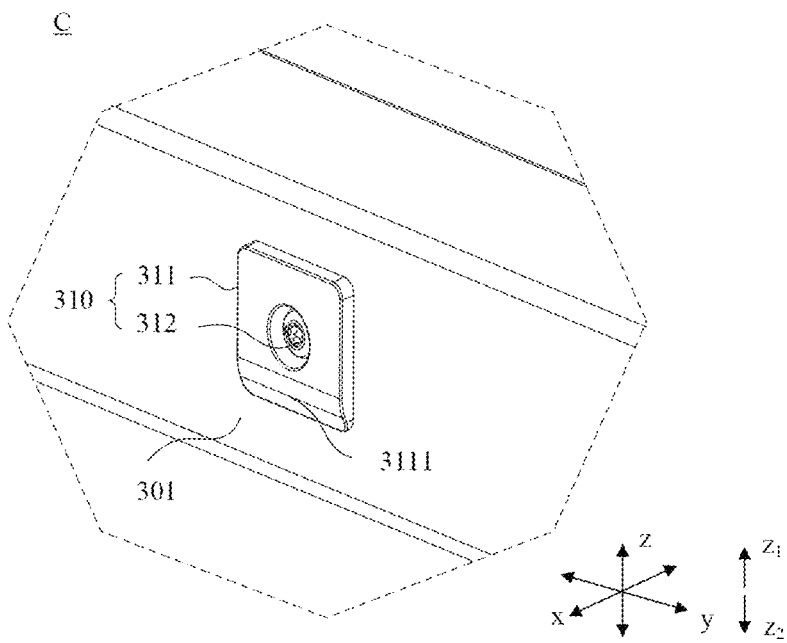
FIG. 16 is a schematic perspective view of a third position-limit member according to an embodiment of the present application.
Figure 17:
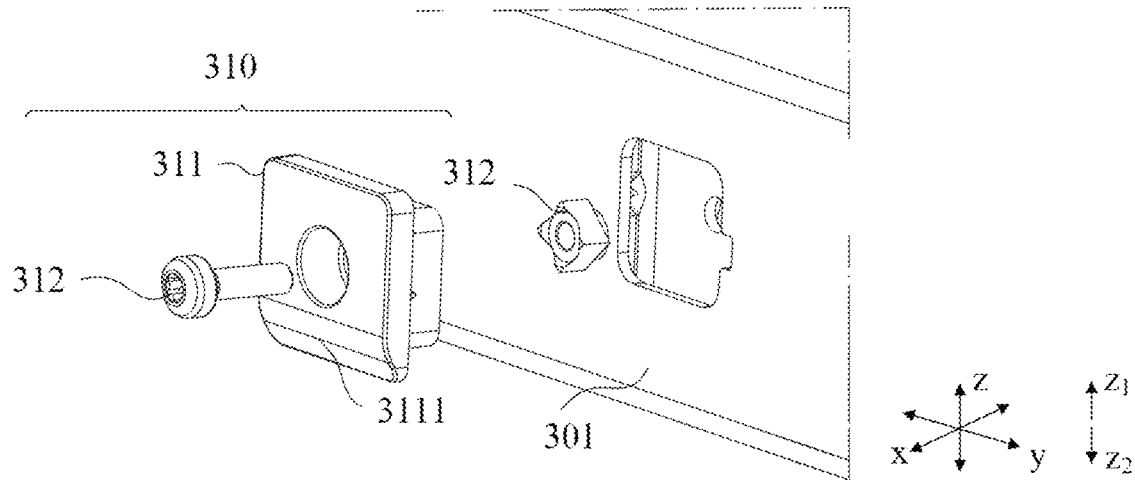
FIG. 17 is a schematic exploded view of a third position-limit member according to an embodiment of the present application.
Figure 18:
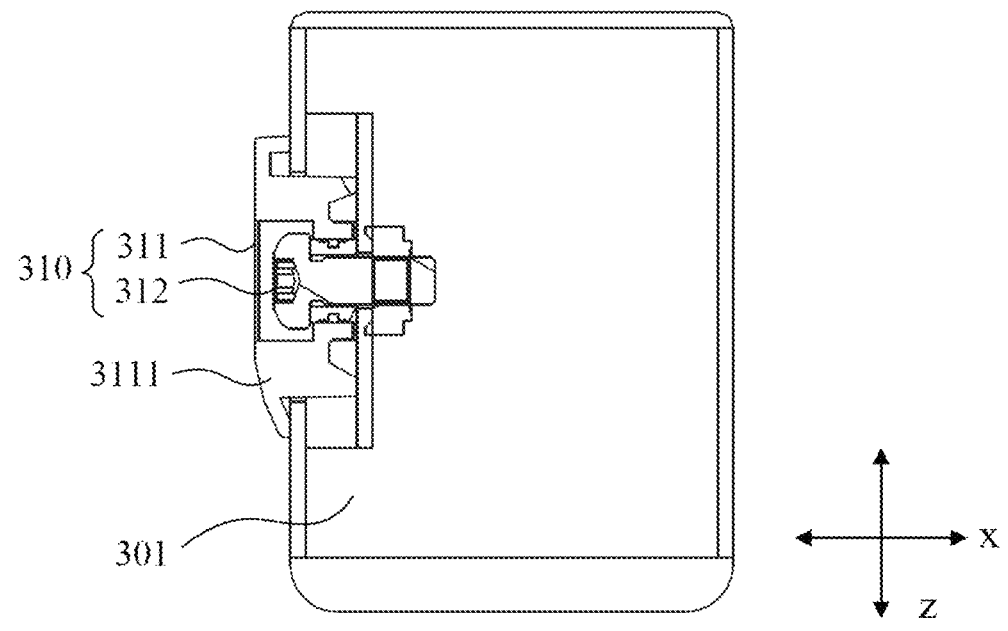
FIG. 18 is a schematic cross-sectional view of a third position-limit member according to an embodiment of the present application.

For the third position-limit member 310, FIG. 16 shows a schematic perspective view. FIG. 16 may be a partial enlarged view of part C in FIG. 15. FIG. 17 shows a schematic exploded view of the third position-limit member 310. FIG. 18 shows a schematic cross-sectional view of the third position-limit member 310 along the plane xz in FIG. 16. The plane xz is a plane determined according to the x direction and the direction z, the direction x is the first direction x in the foregoing embodiments of the present application, and the direction z may be parallel to the direction of gravity, wherein the direction z includes the opposite direction of gravity $z_1$ and the direction of gravity $z_2$.

As shown in FIGS. 16 to 18, the third position-limit member 310 may include a third position-limit block 311 and a second fastener 312. The second fastener 312 is used to fix the third position-limit block 311 to the first beam 301, and one end 3111 of the third position-limit block 311 facing toward the direction of gravity is provided with a wedge angle.

Optionally, as shown in FIG. 16 and FIG. 17, in the embodiment of the present application, the overall shape of the third position-limit block 311 may be similar to a block, with a mounting position provided in the middle; the second fastener 312 passes through the mounting position in the middle of the third position-limit block 311 so as to restrict the third position-limit block 311 to the first beam 301. Compared with the manner of providing the third fastener 312 at other positions of the third position-limit block 311, the manner in this embodiment can achieve a better fixing effect. The second fastener 312 includes, but is not limited to, a bolt and a nut, facilitating mounting and demounting of the third position-limit block 311.

Specifically, after the box 20 is mounted on the holder 30, the third position-limit block 311 in the third position-limit member 310 is used to engage with the box 20 to prevent the relative displacement of the box 20. In order to ensure the wear resistance of the third position-limit block 311 and prolong its service life, the third position-limit block 311 may be made of a wear-resistant material. As an example, the wear-resistant material includes but is not limited to a Polyoxymethylene (POM) material with high mechanical strength and rigidity.

Optionally, in some application scenarios, the box 20 can be mounted on the electrical apparatus toward the opposite direction of gravity $z_1$, for example, the electrical apparatus is the vehicle 1, and the box 20 can be lifted and mounted on the holder 30 on a chassis of the vehicle 1, that is, the box 20 is mounted on the holder 30 in the vehicle 1 toward the opposite direction of gravity.

In this application scenario, an end 3111 of the third position-limit block 311 in the embodiment of the present application facing toward the opposite direction of gravity may be provided with a wedge angle, so that when mounting the box 20 on the holder 30, the box can be moved step by step toward the opposite direction of gravity $z_1$ by the aid of the end 3111 of the third position-limit block 311. The end 3111 can be used for guiding and positioning the box 20 when mounting the box 20 to the holder 30 so that the box 20 can be mounted in the holder 30 more conveniently.

It should be noted that, in the embodiment of the present application, the holder 30 includes a third position-limit member 310, and the third position-limit member 310 can match with the first position-limit member 210 of the box 20 in the foregoing embodiments of the present application. In other embodiments, the holder 30 may include the first position-limit member 210 described above, and the box 20 may include a third position-limit member 310, that is, even when the position-limit members in the holder 30 and the box 20 are interchanged, after the box 20 is mounted on the holder 30, the first position-limit member 210 and the third position-limit member 310 can still match with each other, so as to realize the stable installation of the box 20 in the holder 30.

However, the structure of the first position-limit member 210 is a little more complicated, the buffer block 212 is required for to realize buffering of the first position-limit block 211. Compared with the third position-limit member 310, the first position-limit member 210 needs to be maintained and replaced frequently, and thus, it is convenient to maintain and replace the first position-limit member 210 since the first position-limit member 210 is disposed on the box 20.

Figure 19:
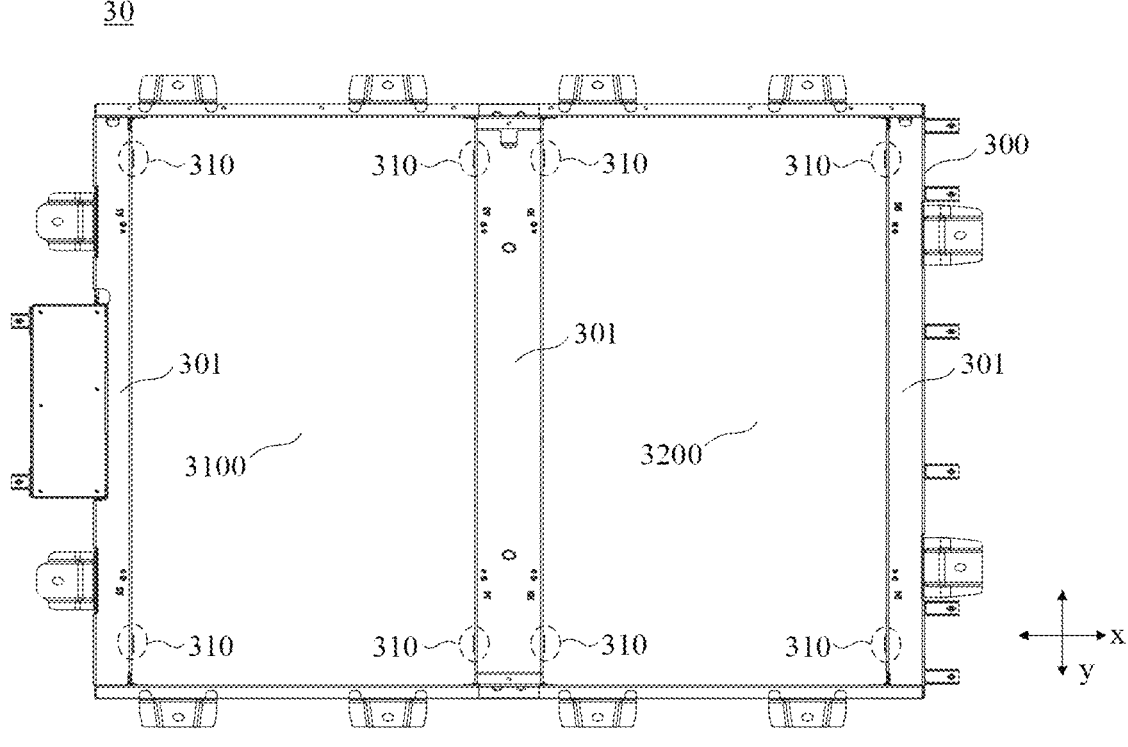
FIG. 19 is a schematic plan view of a holder according to an embodiment of the present application.

FIG. 19 shows a schematic plan view of a holder 30 provided in an embodiment of the present application.

Optionally, as shown in FIG. 19, the holder 30 may include a plurality of third position-limit members 310 described above, and the plurality of third position-limit members 310 may be distributed on at least two first beams 301 in the holder body 300 that are parallel to each other.

Specifically, in the embodiment of the present application, the extension directions of the at least two first beams 301 are both perpendicular to the first direction x, that is, perpendicular to the traveling direction of the electrical apparatus. According to the embodiment of the present application, using a space of at least two first beams 301, the plurality of third position-limit members 310 are distributed on the at least two first beams 301, the third position-limit members 310 on the at least two first beams 301 in the holder body 300 each can generate an acting force in the first direction x with the box 20, so that the box 20 can be clamped with the holder body 300 in the first direction x, to further limit the relative displacement of the box 20 in the holder 30 along the first direction x, thereby improving the installation stability of the box 20 in the electrical apparatus.

Optionally, in the embodiment of the present application, the plurality of third position-limit members 310 can be further distributed at the four corners of the space for accommodating the box 20 in the holder body 300, so as to be correspondingly disposed at the four corners of the box 20 to limit the relative displacements of the four corners of the box 20 in the holder 30, thereby comprehensively improving the installation stability of the box 20 in the holder 30 and the electrical apparatus where the box is located.

As an example, in the embodiment shown in FIG. 19, the holder body 300 includes a first space 3100 and a second space 3200 that are used for accommodating the box 20, and a plurality of third position-limit members 310 are respectively disposed at four corners of the first space 3100 and second space 3200 to improve the installation stability of two boxes 20 mounted in the holder 30.

Figure 20:
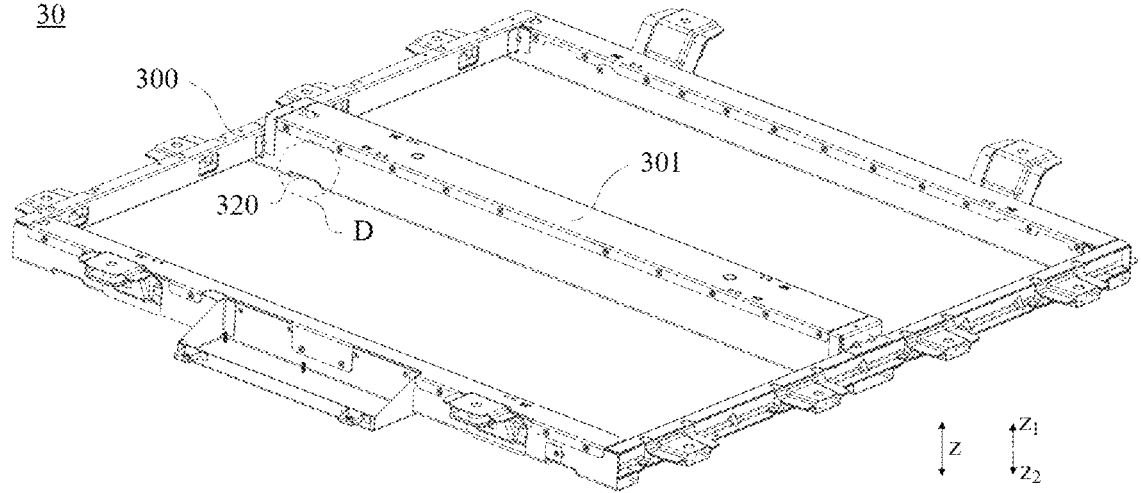
FIG. 20 is a schematic structural diagram of a holder according to an embodiment of the present application.

FIG. 20 shows a schematic structural diagram of a holder 30 provided in an embodiment of the present application.

Optionally, as shown in FIG. 20, the holder 30 provided in this embodiment of the present application may include a fourth position-limit member 320, the fourth position-limit member 320 being disposed on the holder body 300 for limiting a relative displacement of the box 20 in the second direction z, where the second direction z is parallel to the direction of gravity.

Optionally, in the embodiment of the present application, the fourth position-limit member 320 may be disposed on any beam of the holder body 300. In some embodiments, it may be disposed on one side of any beam in the holder body 300 in the direction of gravity, or it may also be disposed on one side of any beam in the holder body 300 in the opposite direction of gravity.

Based on the technical solution of the embodiment of the present application, the holder body 300 is provided with the fourth position-limit member 320, the fourth position-limit member 320 can generate an acting force in the second direction with the box 20, that is, the fourth position-limit member 320 can generate an acting force in the direction of gravity $z_2$ and the opposite direction of gravity $z_1$ with the box 20, so as to limit the relative displacement of the box 20 in the direction of gravity $z_2$ and the opposite direction of gravity $z_1$, thereby further improving installation stability of the box 20 in the holder 30 and ensuring normal operations of the battery 10 and the electrical apparatus where the battery is located.

As an example, in the embodiment shown in FIG. 20, the fourth position-limit member 320 may also be disposed on the first beam 301 of the holder body 300 in the foregoing embodiments of the present application. In this case, FIG. 21 shows a schematic perspective view of the fourth position-limit member 320, and FIG. 21 may be a partial enlarged view of part B in FIG. 20.

Figure 21:
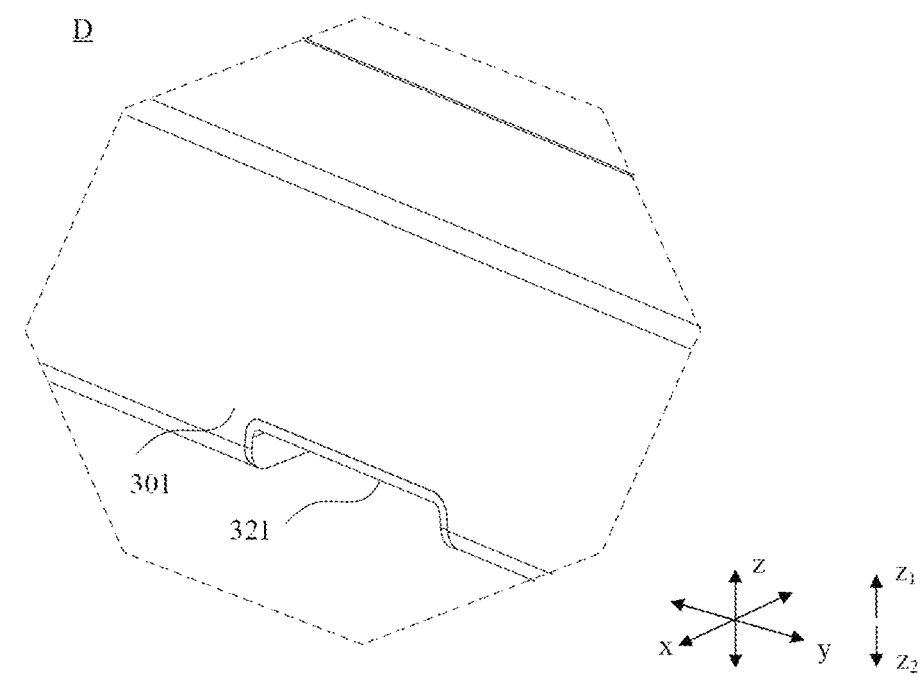
FIG. 21 is a schematic perspective view of a fourth position-limit member according to an embodiment of the present application.

As an example, in an embodiment shown in FIG. 21, the fourth position-limit member 320 includes a recess structure 321, the recess structure 321 is provided on one side of the first beam 301 in the direction of gravity $z_2$, and the recess structure 321 has an opening towards the direction of gravity $z_2$.

With this embodiment, when the box 20 of the battery 10 is mounted on the holder 30 toward the opposite direction of gravity $z_1$, the recess structure 321 disposed on one side of the first beam 301 in the direction of gravity $z_2$ is easy to be in contact fit with the box 20.

Specifically, the recess structure 321 can be used for accommodating a protruding component in the box 20 of the battery 10, so that the recess structure 321 can match with the protruding component in the box 20 and restrict the relative displacement of the box 20 in the holder body 300, thereby improving the installation stability of the box 20 in the holder 30.

Optionally, in some embodiments, the recess structure 321 in the embodiment of the present application can match with the second position-limit member 220 in the foregoing embodiments of the present application. The recess structure 321 can be used for accommodating the second position-limit member 220, and is in closely press fit with the second position-limit member 220, so that the box 20 and the holder body 300 are clamped in the second direction z, thereby improving the installation stability of the box 20 in the gravitational direction of gravity $z_2$ and the opposite direction of gravity $z_1$ of the holder body 300.

In addition, the recess structure 321 can not only realize the clamping of the box 20 and the holder body 300 in the second direction z, but also realize the position limiting of the box 20 and the holder body 300 in the third direction y, improving the installation stability of the body 20 on the holder body 300 in the third direction y.

Since the fourth position-limit member 320 in the embodiment of the present application needs to engage with the box 20, in order to prevent the box 20 from being worn and corroded, and keep clamped with the box 20, the material of the fourth position-limit member 320 includes but is not limited to a wear-resistant and rust-resistant material such as stainless steel, and the fourth position-limit member 320 can achieve a good close fit with the second position-limit member 220 in the box 20, such as an elastic position-limit block.

It should be noted that, in the embodiment of the present application, the holder 30 includes the fourth position-limit member 320, and the fourth position-limit member 320 can match with the second position-limit member 220 of the box 20 in the foregoing embodiments of the present application. In other embodiments, the holder 30 may include the second position-limit member 220 described above, and the box 20 may include a fourth position-limit member 320, that is, even when the position-limit members in the holder 30 and the box 20 are interchanged, after the box 20 is mounted on the holder 30, the second position-limit member 220 and the fourth position-limit member 320 can still match with each other, so as to realize the stable installation of the box 20 in the holder 30.

However, if the second position-limit member 220 is an elastic position-limit block, compared with the fourth position-limit member 320, the second position-limit member 220 needs to be repaired or replaced more frequently. Therefore, it is convenient to maintain and replace the second position-limit member 220 since the second position-limit member 220 is disposed on the box 20.

Optionally, the center of the third position-limit member 310 and the center of the fourth position-limit member 320 are located on a first plane, and the first plane is parallel to a plane determined by the first direction x and the second direction z.

Optionally, in some embodiments, the center of the third position-limit member 310 may be understood as the geometric center or the center of gravity of any module in the third position-limit member 310. For example, the center of the third position-limit member 310 may be the geometric center of the third position-limit member 311 described above. Similarly, the center of the fourth position-limit member 320 may also be understood as the geometric center or center of gravity of any module in the fourth position-limit member 320. For example, the center of the fourth position-limit member 320 may be the geometric center of the recess structure 321.

Figure 22:
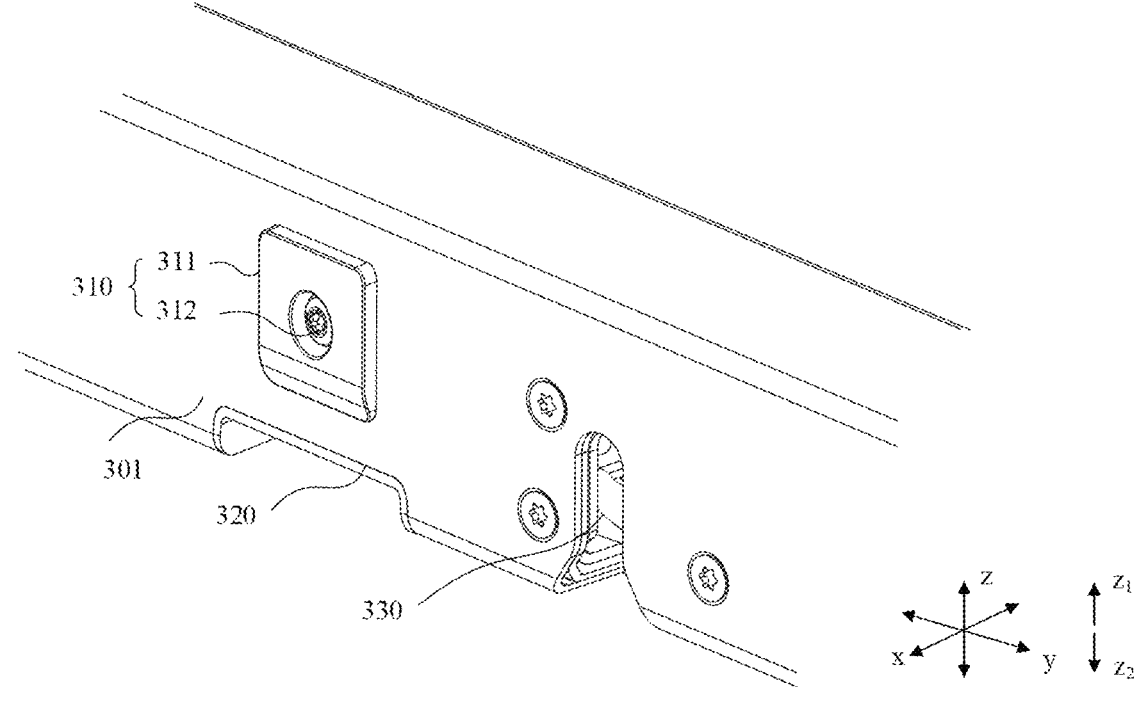
FIG. 22 is a schematic perspective view of a third position-limit member and a fourth position-limit member according to an embodiment of the present application.

In this case, FIG. 22 shows a schematic perspective view of a third position-limit member 310 and a fourth position-limit member 320 in an embodiment of the present application.

In the embodiment shown in FIG. 22, both the third position-limit member 310 and the fourth position-limit member 320 may be disposed on the same first beam 301 of the holder body 300, and the third position-limit member 310 and the fourth position-limit member 320 are adjacently arranged. Specifically, the third position-limit member 310 and the fourth position-limit member 320 are disposed on two sides of the first beam 301 that are perpendicular to and adjacent to each other. In addition, in this embodiment, the center of the third position-limit member 310 and the center of the fourth position-limit member 320 are located on a first plane, and the first plane is parallel to the plane xz.

In addition to the manner as shown in the embodiment in FIG. 22 that the third position-limit member 310 and the fourth position-limit member 320 are disposed on the same first beam 301 of the holder body 300, the third position-limit member 310 can be disposed on one first beam 301 in the holder body 300, and the fourth position-limit member 320 can be disposed on the other first beam 301 in the holder body 300, where the center of the third position-limit member 310 and the center of the fourth position-limit member 320 may also be located on the first plane that is parallel to the plane xz.

Based on the technical solution of the embodiment of the present application, the center of the third position-limit member 310 and the center of the fourth position-limit member 320 are both located on the first plane that is parallel to the plane xz. After the box 20 is mounted on the holder 30, an acting force between the third position-limit member 310 and the box 20 as well as an acting force between the fourth position-limit member 320 and the box 20 is concentrated on the same plane, further improving the installation stability of the box 20 in the holder 30. Further, if the third position-limit member 310 and the fourth position-limit member 320 are adjacently arranged on the same first beam 301, the acting force between the third position-limit member 310 and fourth position-limit member 320 and the box 20 is more concentrated, so that the installation stability of the box 20 in the holder 30 can be further improved; moreover, the third position-limit member 310 and the fourth position-limit member 320 are adjacently arranged, which also facilitates the installation and maintenance of the third position-limit member 310 and the fourth position-limit member 320.

Further, as shown in FIG. 22, the holder 30 may further include a second mounting member 330, the second mounting member 330 being used to lock the box 20 on the holder body 300. The third position-limit member 310 can be arranged adjacent to the second mounting members 330.

As an example, in an embodiment shown in FIG. 22, the second mounting member 330 may include a locking mechanism and a channel, which may engage with the first mounting member 230 in the box 20 (e.g., the locking portion shown in FIG. 12), realizing locking and releasing of the box 20 in the holder 30.

Based on the technical solution of the embodiment of the present application, the second mounting member 330 for securing the box 20 and the third position-limit member 310 are adjacently arranged, under a position limiting effect of the third position-limit member 310, the reliability in locking installation of the box 20 by the second mounting member 330 can be improved, thereby further improving the installation stability of the box 20 in the holder 30.

In addition, it can be understood that, as shown in FIG. 22, if the fourth position-limit member 320 and the third position-limit member 310 are adjacently arranged, the fourth position-limit member 320 and the second mounting member 330 are also adjacently arranged, thereby further improving the reliability in locking installation of the box 20 by the second mounting member 330 and the installation stability of the box 20 in the holder 30.

Figure 23:
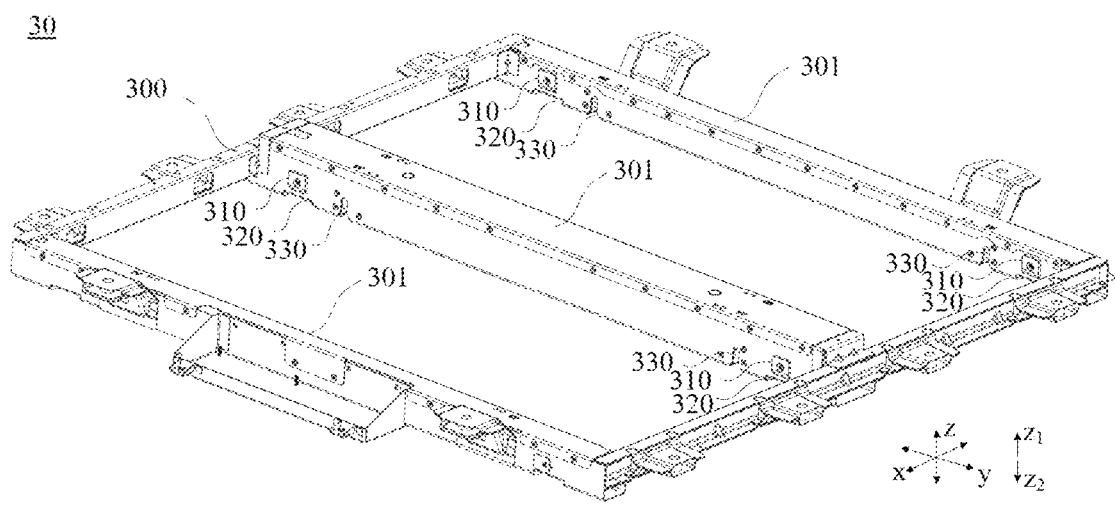
FIG. 23 is a schematic structural diagram of a holder according to an embodiment of the present application.
Figure 24:
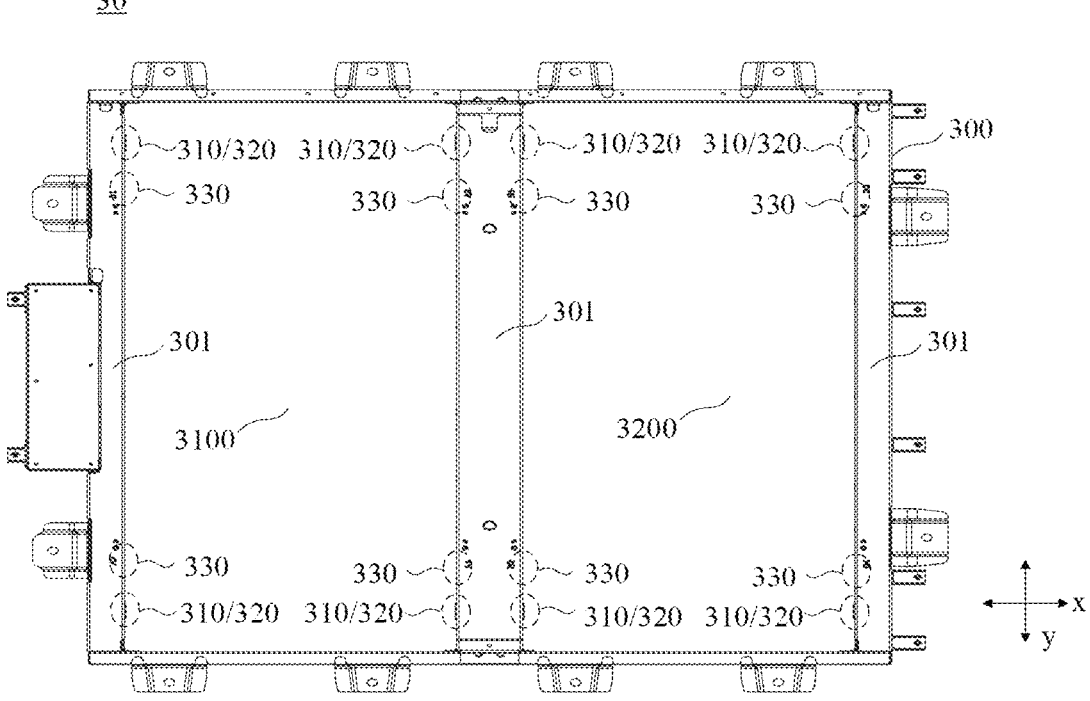
FIG. 24 is a schematic plan view of a holder according to an embodiment of the present application.

In this embodiment, FIG. 23 shows a schematic perspective view of a holder 30. FIG. 24 shows a schematic plan view of the box 20 in FIG. 23 along a plane xy.

As shown in FIG. 23 and FIG. 24, the holder 30 may include a plurality of the above-mentioned third position-limit members 310 and a plurality of the above-mentioned fourth position-limit members 320. The plurality of third position-limit members 310 may be distributed on at least one first beam 301 in the holder body 300, and the plurality of fourth position-limit members 320 and the plurality of third position-limit members 310 are in one-to-one correspondence and are adjacently arranged.

Optionally, the holder 30 further includes a plurality of the above-mentioned second mounting members 330. The plurality of second mounting members 330 may be distributed at the four corners of a space for accommodating the box 20 in the holder body 300, so as to be correspondingly disposed at the four corners of the box 20 to limit the relative displacements of the four corners of the box 20 in the holder 30, thereby comprehensively improving the installation stability of the box 20 in the holder 30 and the electrical apparatus where the box is located.

As an example, in the embodiment shown in FIG. 24, the holder body 300 includes two spaces, i.e., a space 3100 and a space 3200 for accommodating the box 20, and a plurality of second mounting members 330 are distributed at four corners of the space 3100 and the space 3200 respectively, and are disposed on two first beams 301 that are parallel to each other. Further, the plurality of second mounting members 330 may be adjacently disposed and correspond to the third position-limit members 310 and the fourth position-limit members 320, so that the third position-limit members 310 and the fourth position-limit members 320 can ensure the reliability in locking installation of the box 20 by the second mounting members 330 and the installation stability of the box 20 in the holder 30.

An embodiment of the present application further provides a battery 10. The battery 10 may include a battery cell 100, and the box 20 described in the foregoing embodiments, the box 20 being used for accommodating the battery cell 100.

An embodiment of the present application further provides an electrical apparatus, and the electrical apparatus may include the battery 10 in the foregoing embodiments and the holder 30 in the foregoing embodiments. A third position-limit member 310 in the holder 30 matches with a first position-limit member 210 in the battery 10 to limit a relative displacement of the battery 10 in a first direction x. The battery 10 is configured to provide electrical energy for the electrical apparatus. Optionally, the electrical equipment may be a vehicle 1, a ship or a spacecraft.

The box 20 of the battery 10, the battery 10, and the electrical apparatus of the embodiments of the present application are described above, and a method and device for preparing a battery of the embodiments of the present application will be described below. For the parts not described in detail, reference may be made to the foregoing examples.

Figure 25:
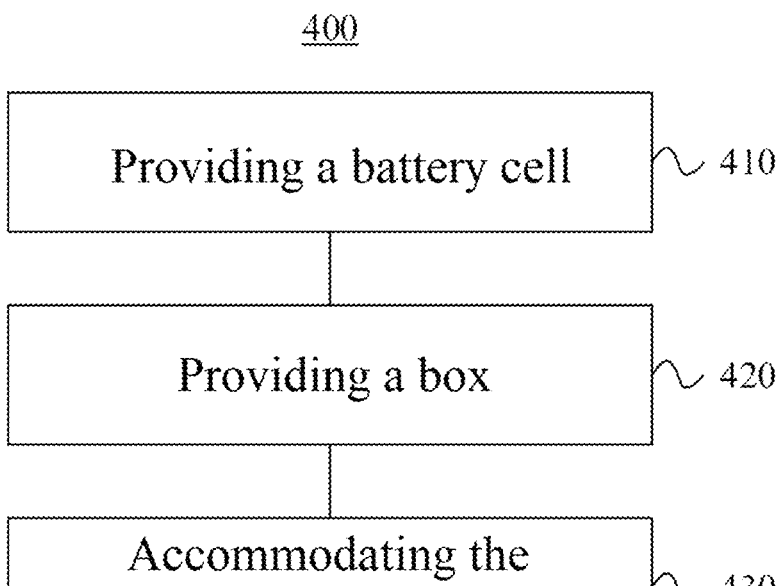
FIG. 25 is a schematic flowchart of a method for preparing a battery according to an embodiment of the present application.

FIG. 25 shows a schematic flowchart of a method 400 for preparing a battery according to an embodiment of the present application. As shown in FIG. 25, the method 400 may include:

410, providing a battery cell 100;

420, providing a box 20, the box 20 including a box body 200 for accommodating a battery cell 100; a first position-limit member 210 disposed on a side of a first wall 201 of the box body 200 away from the battery cell 100, wherein the first wall 201 is perpendicular to a first direction x, the first direction x is parallel to a traveling direction of an electrical apparatus after the box 20 is mounted on the electrical apparatus, and the first position-limit member 210 is used to limit a relative displacement of the box 20 in the first direction x; and 430, accommodating the battery cell 100 in the box 20.

Figure 26:
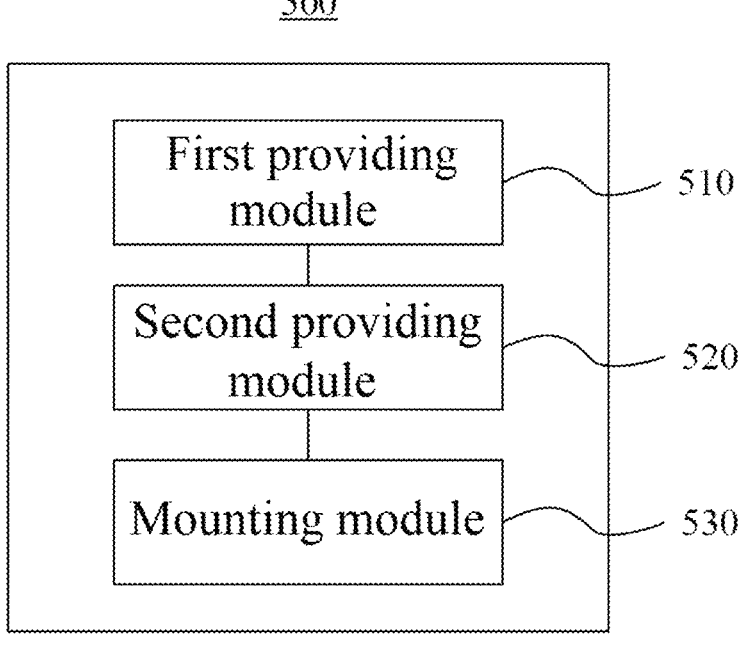
FIG. 26 is a schematic block diagram of a device for preparing a battery according to an embodiment of the present application.

FIG. 26 shows a schematic block diagram of a device 500 for preparing a battery according to an embodiment of the present application. As shown in FIG. 26, the device 500 for preparing a battery may include: a first providing module 510, a second providing module 520 and a mounting module 530.

The first providing module 510 is configured to provide a battery cell 100.

The second providing module 520 is configured to provide a box 20, the box 20 including a box body 200 for accommodating a battery cell 100; a first position-limit member 210 disposed on a side of a first wall 201 of the box body 200 away from the battery cell 100, wherein the first wall 201 is perpendicular to a first direction x, the first direction x is parallel to a traveling direction of an electrical apparatus after the box 20 is mounted on the electrical apparatus, and the first position-limit member 210 is used to limit a relative displacement of the box 20 in the first direction x.

The mounting module 530 is used for accommodating the battery cell 100 in the box 20.

While the present application has been described with reference to the preferred examples, various modifications may be made and components therein may be replaced with equivalents without departing from the scope of the present application. In particular, the technical features mentioned in the various examples can be combined in any manner as long as there is no structural conflict. The present application is not limited to the specific examples disclosed herein, but rather includes all technical solutions falling within the scope of the claims.

What is claimed is:

1. A battery box, comprising:
   a box body enclosing a chamber for accommodating a battery cell; and
   a first position-limit structure disposed on a side of a first wall of the box body opposite from the battery cell, wherein the first wall is perpendicular to a first direction, after the box body is mounted on an electrical apparatus, the first direction is parallel to a traveling direction of the electrical apparatus, and the first position-limit structure is used to limit a relative displacement of the battery box to the electrical apparatus in the first direction, the first wall comprising an extending structure, the extending structure extending away from the battery cell along the first direction, and the extending structure being used for arrangement of a second position-limit structure;
   wherein the first position-limit structure and the second position-limit structure are both disposed on the first wall of the box body and the first position-limit structure and the second position-limit structure are adjacently arranged, the first position-limit structure being disposed in a first region of the first wall, and the second position-limit structure being disposed on the extending structure,
   the first position-limit structure comprises: a first position-limit block and a buffer block, the first position-limit block is disposed on the first wall and is capable of moving along the first direction, the buffer block is disposed between the first position-limit block and the first wall, and the buffer block is used to provide a buffer distance of the first position-limit block in the first direction,
   the first wall of the box body contains a recess to accommodate the first position-limit block and the buffer block, and in the first direction, a depth of the recess is greater than a thickness of the buffer block, and
   the battery box further includes a locking structure, which is disposed on a side of the first wall of the box body away from the battery cell, the locking structure is configured to secure or release the battery box to the electrical apparatus, and the first position-limit structure is disposed adjacent to the locking structure.

2. The battery box according to claim 1, wherein the battery box further comprises:
   the second position-limit structure disposed on a side of the box body opposite from the battery cell and used to limit a relative displacement of the battery box to the electrical apparatus in a second direction, wherein the second direction is parallel to the direction of gravity after the battery box is mounted on the electrical apparatus.

3. The battery box according to claim 2, wherein the second position-limit structure is an elastic position-limit block, and the elastic position-limit block is compressed to abut against the electrical apparatus after the battery box is mounted on the electrical apparatus.

4. The battery box according to claim 3, wherein a first end of the elastic position-limit block is provided with a chamfer structure, and the first end of the elastic position-limit block is an end of the elastic position-limit block facing toward the opposite direction of gravity.

5. The battery box according to claim 2, wherein the center of the first position-limit structure and the center of the second position-limit structure are located on a first plane, and the first plane is parallel to a plane defined by the first direction and the second direction.

6. The battery box according to claim 1, wherein the first position-limit structure further comprises: a first fastener, the first position-limit block is disposed on the first wall through the first fastener, and the first fastener is used to provide a buffer space of the first position-limit block and the buffer block in the first direction.

7. The battery box according to claim 1, wherein a first end of the first position-limit block is provided with an angle between a surface of the first wall and a surface of the first position-limit block, and the first end of the first position-limit block is an end of the first position-limit block facing toward the opposite direction of gravity.

8. The battery box according to claim 1, wherein the first wall is provided with an accommodating area, the accommodating area being used for accommodating the first position-limit structure.

9. The battery box according to claim 1, wherein the battery box comprises a plurality of first position-limit structures, the plurality of first position-limit structures being distributed on two first walls of the box body that are parallel to each other.

10. A battery, comprising: a battery cell and the battery box according to claim 1, wherein the battery box is used for accommodating the battery cell.

11. An electrical apparatus, comprising: the battery according to claim 10.

12. The battery box according to claim 1, wherein there is an empty space between a bottom surface of the recess and an end surface of the first position-limit block facing the first wall in the first direction.

13. The battery box according to claim 1, wherein in a second direction perpendicular to the first direction, a width of the first position-limit block is longer than that of the buffer block.

14. The battery box according to claim 1, wherein the first position-limit structure further comprises a first fastener, the first position-limit block is disposed on the first wall through the first fastener, and an end surface of the first fastener away from the first wall is closer to the bottom surface of the recess than an end surface of the first position-limit block away from the first wall in the first direction.

* * * * *